US012743830B2

(12) United States Patent
Vecchio et al.

(10) Patent No.: US 12,743,830 B2
(45) Date of Patent: Sep. 22, 2026

(54) GENERATING DIGITAL MATERIALS FROM DIGITAL IMAGES USING A CONTROLLED DIFFUSION NEURAL NETWORK

(71) Applicant: Adobe Inc., San Jose, CA (US)

(72) Inventors: Giuseppe Vecchio, Lyons (FR); Adrien Kaiser, Lyons (FR); Arthur Roullier, Paris (FR); Romain Rouffet, Lyons (FR); Valentin Deschaintre, London (GB); Rosalie Martin, Lyons (FR); Tamy Boubekeur, Paris (FR)

(73) Assignee: Adobe Inc., San Jose, CA (US)

( * ) Notice: Subject to any disclaimer, the term of this patent is extended or adjusted under 35 U.S.C. 154(b) by 399 days.

(21) Appl. No.: 18/455,023

(22) Filed: Aug. 24, 2023

(65) Prior Publication Data

US 2025/0069373 A1 Feb. 27, 2025

(51) Int. Cl.
*G06T 15/04* (2011.01)
*G06T 5/50* (2006.01)
(Continued)

(52) U.S. Cl.
CPC ................ *G06T 15/04* (2013.01); *G06T 5/50* (2013.01); *G06T 5/70* (2024.01); *G06T 5/77* (2024.01);
(Continued)

(58) Field of Classification Search
CPC ............. G06T 5/70; G06T 11/60; G06T 5/77; G06T 11/001; G06T 15/205; G06T 3/40; G06T 3/4038; G06T 5/50; G06T 2207/20221; G06T 17/20; G06T 11/40; G06T 17/00; G06T 15/04; G06T 2207/20084; G06T 2207/20081; G06T 5/60; G06T 3/4046; G06T 9/002; G06V 10/40; G06V 10/54; G06V 10/467; G06V 10/82; G06V 10/70; G06V 10/744; G06N 3/045; G06N 3/0475; G06N 3/0455; G06N 3/02; G06N 3/047
See application file for complete search history.

(56) References Cited

U.S. PATENT DOCUMENTS

2023/0267652 A1 8/2023 Lupascu et al.
2024/0221242 A1* 7/2024 Greenen .................. G06T 5/70
(Continued)

OTHER PUBLICATIONS

Wang, J., Yue, Z., Zhou, S., Chan, K. C., & Loy, C. C. (2023). Exploiting Diffusion Prior for Real-World Image Super-Resolution. arXiv preprint arXiv:2305.07015. (Year: 2023).*
(Continued)

*Primary Examiner* — Andrew W Bee
*Assistant Examiner* — Emma E Dryden
(74) *Attorney, Agent, or Firm* — Keller Preece PLLC

(57) ABSTRACT

The present disclosure relates to systems, methods, and non-transitory computer-readable media that generate digital materials from digital images using a diffusion neural network. For instance, in one or more embodiments, the disclosed systems receive a digital image portraying a scene to be replicated as a digital material. The disclosed systems also generate, using a conditioning neural network, a spatial condition from the digital image. Using a controlled diffusion neural network and based on the spatial condition, the disclosed systems generate a plurality of material maps corresponding to the scene portrayed by the digital image.

20 Claims, 16 Drawing Sheets

(51) Int. Cl.
*G06T 5/70* (2024.01)
*G06T 5/77* (2024.01)
*G06T 11/60* (2006.01)
*G06V 10/774* (2022.01)
*G06V 10/82* (2022.01)

(52) U.S. Cl.
CPC ............ *G06T 11/60* (2013.01); *G06V 10/774* (2022.01); *G06V 10/82* (2022.01); *G06T 2207/20084* (2013.01); *G06T 2207/20221* (2013.01)

(56) References Cited

U.S. PATENT DOCUMENTS

2024/0420405 A1* 12/2024 Sandow ............... H04N 9/3194
2025/0054210 A1* 2/2025 Babanin .................. G06T 11/60

OTHER PUBLICATIONS

Kathuria, Ayoosh. Data Augmentation for Bounding Boxes: Scaling and Translation. Paperspace, 2018 [online], [retrieved on Nov. 10, 2025]. Retrieved from the Internet <URL: https://web.archive.org/web/20230713235510/https://blog.paperspace.com/data-augmentation-bounding-boxes-scaling-translation/> (Year: 2018).*

Ding, Z., Zhang, M., Wu, J., & Tu, Z. (2023). Patched Denoising Diffusion Models for High-Resolution Image Synthesis. arXiv preprint arXiv:2308.01316. (Year: 2023).*

Rombach, R., Blattmann, A., Lorenz, D., Esser, P., & Ommer, B. (2022). High-resolution image synthesis with latent diffusion models. In Proceedings of the IEEE/CVF conference on computer vision and pattern recognition (pp. 10684-10695). (Year: 2022).*

Zhang, L., Rao, A., & Agrawala, M. (2023). Adding Conditional Control to Text-to-Image Diffusion Models. arXiv preprint arXiv:2302.05543. (Year: 2023).*

Xu, X., Wang, Q., Guo, L., Zhang, J., & Ding, S. (2023). FEMRNet: Feature-enhanced multi-scale residual network for image denoising. Applied Intelligence, 53(21), 26027-26049. (Year: 2023).*

Yuan, Q., Wei, Y., Meng, X., Shen, H., & Zhang, L. (2018). A multiscale and multidepth convolutional neural network for remote sensing imagery pan-sharpening. IEEE Journal of Selected Topics in Applied Earth Observations and Remote Sensing, 11(3), 978-989. (Year: 2018).*

Ho, J., Saharia, C., Chan, W., Fleet, D. J., Norouzi, M., & Salimans, T. (2022). Cascaded diffusion models for high fidelity image generation. Journal of Machine Learning Research, 23(47), 1-33. (Year: 2022).*

Whitaker, Jonathan. Multi-Resolution Noise for Diffusion Model Training, Feb. 28, 2023 [online], [retrieved on Mar. 2, 2026]. Retrieved from the Internet <URL: https://wandb.ai/johnowhitaker/multires_noise/reports/Multi-Resolution-Noise-for-Diffusion-Model-Training--VmlldzozNjYyOTU2> (Year: 2023).*

Aaron Van Den Oord, Oriol Vinyals, et al. 2017. Neural discrete representation learning. Advances in neural information processing systems 30 (2017).

Aditya Ramesh, Prafulla Dhariwal, Alex Nichol, Casey Chu, and Mark Chen. 2022. Hierarchical Text-Conditional Image Generation with CLIP Latents. arXiv:2204.06125 [cs.CV].

Adobe. 2022. Substance Source. https://substance3d.adobe.com/assets/.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. 2021. Learning transferable visual models from natural language supervision. In International conference on machine learning. PMLR, 8748-8763.

Alexey Dosovitskiy and Thomas Brox. 2016. Generating images with perceptual similarity metrics based on deep networks. Advances in neural information processing systems 29 (2016).

Álvaro Barbero Jiménez. 2023. Mixture of Diffusers for scene composition and high resolution image generation. arXiv preprint arXiv:2302.02412 (2023).

Andrew Brock, Jeff Donahue, and Karen Simonyan. 2018. Large scale GAN training for high fidelity natural image synthesis. arXiv preprint arXiv:1809.11096 (2018).

Ashish Vaswani, Noam Shazeer, Niki Parmar, Jakob Uszkoreit, Llion Jones, Aidan N Gomez, Łukasz Kaiser, and Illia Polosukhin. 2017. Attention is all you need. Advances in neural information processing systems 30 (2017).

Bin Dai and David Wipf. 2019. Diagnosing and enhancing VAE models. arXiv preprint arXiv:1903.05789 (2019).

Brian Karis and Epic Games. 2013. Real shading in unreal engine 4. Proc. Physically Based Shading Theory Practice 4, 3 (2013), 1.

Bruce Walter, Stephen R Marschner, Hongsong Li, and Kenneth E Torrance. 2007. Microfacet models for refraction through rough surfaces. In Proceedings of the 18th Eurographics conference on Rendering Techniques. 195-206.

Chitwan Saharia, William Chan, Saurabh Saxena, Lala Li, Jay Whang, Emily Denton, Seyed Kamyar Seyed Ghasemipour, Burcu Karagol Ayan, S. Sara Mahdavi, Rapha Gontijo Lopes, Tim Salimans, Jonathan Ho, David J Fleet, and Mohammad Norouzi. 2022. Photorealistic Text-to-Image Diffusion Models with Deep Language Understanding. arXiv:2205.11487 [cs.CV].

D. Guarnera, G. C. Guarnera, A. Ghosh, C. Denk, and M. Glencross. 2016. BRDF Representation and Acquisition. In Proceedings of the 37th Annual Conference of the European Association for Computer Graphics: State of the Art Reports (Lisbon, Portugal) (EG '16). Eurographics Association, Goslar, DEU, 625-650.

Danilo Jimenez Rezende, Shakir Mohamed, and Daan Wierstra. 2014. Stochastic back-propagation and approximate inference in deep generative models. In International conference on machine learning. PMLR, 1278-1286.

Diederik P Kingma and Max Welling. 2013. Auto-encoding variational bayes. arXiv preprint arXiv:1312.6114 (2013).

Duan Gao, Xiao Li, Yue Dong, Pieter Peers, Kun Xu, and Xin Tong. 2019. Deep Inverse Rendering for High-Resolution SVBRDF Estimation from an Arbitrary Number of Images. ACM Trans. Graph. 38, 4, Article 134 (Jul. 2019), 15 pages. https://doi.org/10.1145/3306346.3323042.

Giuseppe Vecchio, Simone Palazzo, and Concetto Spampinato. 2021. SurfaceNet: Adversarial SVBRDF Estimation from a Single Image. In Proceedings of the IEEE/CVF International Conference on Computer Vision. 12840-12848.

Ian Goodfellow, Jean Pouget-Abadie, Mehdi Mirza, Bing Xu, David Warde-Farley, Sherjil Ozair, Aaron Courville, and Yoshua Bengio. 2014. Generative Adversarial Nets. In Advances in Neural Information Processing Systems, Z. Ghahramani, M. Welling, C. Cortes, N. Lawrence, and K.Q. Weinberger (Eds.), vol. 27. Cur-ran Associates, Inc. https://proceedings.neurips.cc/paper_files/paper/2014/file/5ca3e9b122f61f8f06494c97b1afccf3-Paper.pdf.

Ishaan Gulrajani, Faruk Ahmed, Martin Arjovsky, Vincent Dumoulin, and Aaron C Courville. 2017. Improved training of wasserstein gans. Advances in neural information processing systems 30 (2017).

Jascha Sohl-Dickstein, Eric Weiss, Niru Maheswaranathan, and Surya Ganguli. 2015. Deep unsupervised learning using nonequilibrium thermodynamics. In International Conference on Machine Learning. PMLR, 2256-2265.

Jie Guo, Shuichang Lai, Chengzhi Tao, Yuelong Cai, Lei Wang, Yanwen Guo, and Ling Qi Yan. 2021. Highlight-Aware Two-Stream Network for Single-Image SVBRDF Acquisition. ACM Trans. Graph. 40, 4, Article 123 (Jul. 2021), 14 pages. https: //doi.org/10.1145/3450626.3459854.

Jie Guo, Shuichang Lai, Qinghao Tu, Chengzhi Tao, Changqing Zou, and Yanwen Guo. 2023. Ultra-High Resolution SVBRDF Recovery from a Single Image. ACM Trans. Graph. (Apr. 2023). https://doi.org/10.1145/3593798.

Jonathan Ho, Ajay Jain, and Pieter Abbeel. 2020. Denoising diffusion probabilistic models. Advances in Neural Information Processing Systems 33 (2020), 6840-6851.

Kai Zhang, Jingyun Liang, Luc Van Gool, and Radu Timofte. 2021. Designing a practical degradation model for deep blind image

(56) References Cited

OTHER PUBLICATIONS super-resolution. In Proceedings of the IEEE/CVF International Conference on Computer Vision. 4791-4800.
Lars Mescheder. 2018. On the convergence properties of gan training. arXiv preprint arXiv:1801.04406 1 (2018), 16.
Liang Shi, Beichen Li, Miloš Hašan, Kalyan Sunkavalli, Tamy Boubekeur, Radomir Mech, and Wojciech Matusik. 2020. MATch: Differentiable Material Graphs for Procedural Material Capture. ACM Trans. Graph. 39, 6, Article 196 (Dec. 2020), 15 pages.
Luke Metz, Ben Poole, David Pfau, and Jascha Sohl-Dickstein. 2016. Unrolled generative adversarial networks. arXiv preprint arXiv:1611.02163 (2016).
Lvmin Zhang and Maneesh Agrawala. 2023. Adding conditional control to text-to-image diffusion models. arXiv preprint arXiv:2302.05543 (2023).
Martin Arjovsky, Soumith Chintala, and Léon Bottou. 2017. Wasserstein generative adversarial networks. In International conference on machine learning. PMLR, 214-223.
Michael Fischer and Tobias Ritschel. 2022. Metappearance: Meta-Learning for Visual Appearance Reproduction. ACM Trans Graph (Proc. SIGGRAPH Asia) 41, 4 (2022).
Miika Aittala, Tim Weyrich, and Jaakko Lehtinen. 2015. Two-shot SVBRDF Capture for Stationary Materials. ACM Trans. Graph. 34, 4, Article 110 (Jul. 2015), 13 pages. https://doi.org/10.1145/2766967.
Miika Aittala, Timo Aila, and Jaakko Lehtinen. 2016. Reflectance Modeling by Neural Texture Synthesis. ACM Trans. Graph. 35, 4, Article 65 (Jul. 2016), 13 pages. https://doi.org/10.1145/2897824.2925917.
Olaf Ronneberger, Philipp Fischer, and Thomas Brox. 2015. U-net: Convolutional networks for biomedical image segmentation. In Medical Image Computing and Computer-Assisted Intervention—MICCAI 2015: 18th International Conference, Munich, Germany, Oct. 5-9, 2015, Proceedings, Part III 18. Springer, 234-241.
Omer Bar-Tal, Lior Yariv, Yaron Lipman, and Tali Dekel. 2023. MultiDiffusion: Fusing Diffusion Paths for Controlled Image Generation. arXiv preprint arXiv:2302.08113 2 (2023).
Patrick Esser, Robin Rombach, and Bjorn Ommer. 2021. Taming transformers for high-resolution image synthesis. In Proceedings of the IEEE/CVF conference on computer vision and pattern recognition. 12873-12883.
Paul Guerrero, Miloš Hašan, Kalyan Sunkavalli, Radomír Měch, Tamy Boubekeur, and Niloy J. Mitra. 2022. MatFormer: A Generative Model for Procedural Materials. ACM Trans. Graph. 41, 4, Article 46 (Jul. 2022), 12 pages. https://doi.org/10.1145/3528223.13123530173.
Philipp Henzler, Valentin Deschaintre, Niloy J Mitra, and Tobias Ritschel. 2021. Generative Modelling of BRDF Textures from Flash Images. ACM Trans Graph (Proc. SIGGRAPH Asia) 40, 6 (2021).
Phillip Isola, Jun-Yan Zhu, Tinghui Zhou, and Alexei A Efros. 2017. Image-to-image translation with conditional adversarial networks. In Proceedings of the IEEE conference on computer vision and pattern recognition. 1125-1134.
Prafulla Dhariwal and Alexander Nichol. 2021. Diffusion models beat gans on image synthesis. Advances in Neural Information Processing Systems 34 (2021), 8780-8794.
Qingqing Huang, Daniel S. Park, Tao Wang, Timo I. Denk, Andy Ly, Nanxin Chen, Zhengdong Zhang, Zhishuai Zhang, Jiahui Yu, Christian Frank, Jesse Engel, Quoc V. Le, William Chan, Zhifeng Chen, and Wei Han. 2023. Noise2Music: Text-conditioned Music Generation with Diffusion Models. arXiv:2302.03917 [cs.SD].
Robert L Cook and Kenneth E. Torrance. 1982. A reflectance model for computer graphics. ACM Transactions on Graphics (ToG) 1, 1 (1982), 7-24.
Robin Rombach, Andreas Blattmann, Dominik Lorenz, Patrick Esser, and Björn Ommer. 2022. High-resolution image synthesis with latent diffusion models. In Proceedings of the IEEE/CVF Conference on Computer Vision and Pattern Recognition. 10684-10695.
Robin Rombach, Patrick Esser, and Björn Ommer. 2020a. Making sense of cnns: Interpreting deep representations and their invariances with inns. In Computer Vision—ECCV 2020: 16th European Conference, Glasgow, UK, Aug. 23-28, 2020, Proceedings, Part XVII 16. Springer, 647-664.
Robin Rombach, Patrick Esser, and Bjorn Ommer. 2020b. Network-to-network translation with conditional invertible neural networks. Advances in Neural Information Processing Systems 33 (2020), 2784-2797.
Rosalie Martin, Arthur Roullier, Romain Rouffet, Adrien Kaiser, and Tamy Boubekeur. 2022. MaterIA: Single Image High-Resolution Material Capture in the Wild. Computer Graphics Forum 41, 2 (2022), 163-177. https://doi.org/10.1111/cgf.14466 1356 arXiv:https://onlinelibrary.wiley.com/doi/pdf/10.1111/cgf.14466.
Tero Karras, Samuli Laine, Miika Aittala, Janne Hellsten, Jaakko Lehtinen, and Timo Aila. 2020. Analyzing and improving the image quality of stylegan. In Proceedings of the IEEE/CVF conference on computer vision and pattern recognition. 8110-8119.
Tero Karras, Timo Aila, Samuli Laine, and Jaakko Lehtinen. 2017. Progressive growing of gans for improved quality, stability, and variation. arXiv preprint arXiv:1710.10196 1346 (2017).
Valentin Deschaintre, George Drettakis, and Adrien Bousseau. 2020. Guided Fine-Tuning for Large-Scale Material Transfer. Computer Graphics Forum (Proceedings of the Eurographics Symposium on Rendering) 39, 4 (2020). http://www-sop.inria.fr/reves/Basilic/2020/DDB20.
Valentin Deschaintre, Miika Aittala, Frédo Durand, George Drettakis, and Adrien Bousseau. 2018. Single-Image SVBRDF Capture with a Rendering-Aware Deep Network. ACM Transactions on Graphics (SIGGRAPH Conference Proceedings) 37, 128 (Aug. 2018), 15. http://www-sop.inria.fr/reves/Basilic/2018/DADDB18.
Valentin Deschaintre, Miika Aittala, Frédo Durand, George Drettakis, and Adrien Bousseau. 2019. Flexible SVBRDF Capture with a Multi-Image Deep Network. Com-puter Graphics Forum (Eurographics Symposium on Rendering Conference Proceedings) 38, 4 (Jul. 2019), 13. http://www-sop.inria.fr/reves/Basilic/2019/DADDB19.
Wes McDermott. 2018. Maps common to both workflow. Allergorithmic, 75-79.
Xiao Li, Yue Dong, Pieter Peers, and Xin Tong. 2017. Modeling Surface Appearance from a Single Photograph Using Self-Augmented Convolutional Neural Networks. ACM Trans. Graph. 36, 4, Article 45 (Jul. 2017), 11 pages. https://doi.org/10.1145/3072959.3073641.
Xilong Zhou and Nima Khademi Kalantari. 2021. Adversarial Single-Image SVBRDF Estimation with Hybrid Training. Computer Graphics Forum (2021).
Xilong Zhou and Nima Khademi Kalantari. 2022. Look-Ahead Training with Learned Reflectance Loss for Single-Image SVBRDF Estimation. ACM Transactions on Graphics 41,6(122022). https://doi.org/10.1145/3550454.3555495.
Xilong Zhou, Milos Hasan, Valentin Deschaintre, Paul Guerrero, Kalyan Sunkavalli, and Nima Khademi Kalantari. 2022. TileGen: Tileable, Controllable Material Generation and Capture. In SIGGRAPH Asia 2022 Conference Papers (Daegu, Republic of Korea) (SA '22). Association for Computing Machinery, New York, NY, USA, Article 34, 8 pages. https://doi.org/10.1145/3550469.3555403.
Xilong Zhou, Miloš Hašan, Valentin Deschaintre, Paul Guerrero, Kalyan Sunkavalli, and Nima Khademi Kalantari. 2023b. A Semi-Procedural Convolutional Material Prior. Computer Graphics Forum n/a, n/a (2023). https://doi.org/10.1111/cgf.14781 arXiv:https://onlinelibrary.wiley.com/doi/pdf/10.1111/cgf.14781.
Xilong Zhou, Milos Hasan, Valentin Deschaintre, Paul Guerrero, Yannick Hold-Geoffroy, Kalyan Sunkavalli, and Nima Khademi Kalantari. 2023a. PhotoMat: A Material Generator Learned from Single Flash Photos. In ACM SIGGRAPH 2023 Conference Proceedings (Los Angeles, CA, USA) (SIGGRAPH '23). Association for Computing Machinery, New York, NY, USA.
Yang Song, Prafulla Dhariwal, Mark Chen, and Ilya Sutskever. 2023. Consistency Models. arXiv:2303.01469 [cs.LG].
Yiwei Hu, Chengan He, Valentin Deschaintre, Julie Dorsey, and Holly Rushmeier. 2022b. An Inverse Procedural Modeling Pipeline

(56) References Cited

OTHER PUBLICATIONS for SVBRDF Maps. ACM Trans. Graph. 41, 2, Article 18 (Jan. 2022), 17 pages. https://doi.org/10.1145/3502431.

Yiwei Hu, Julie Dorsey, and Holly Rushmeier. 2019. A Novel Framework for Inverse Procedural Texture Modeling. ACM Trans. Graph. 38, 6, Article 186 (Nov. 2019), 14 pages. https://doi.org/10.1145/3355089.3356516.

Yiwei Hu, Paul Guerrero, Milos Hasan, Holly Rushmeier, and Valentin Deschaintre. 2022a. Node Graph Optimization Using Differentiable Proxies. In ACM SIGGRAPH 2022 Conference Proceedings (Vancouver, BC, Canada) (SIGGRAPH '22). Association for Computing Machinery, New York, NY, USA, Article 5, 9 pages. https://doi.org/10.1145/3528233.3530733.

Yiwei Hu, Paul Guerrero, Milos Hasan, Holly Rushmeier, and Valentin Deschaintre. 2023. Generating Procedural Materials from Text or Image Prompts. In ACM SIGGRAPH 2023 Conference Proceedings.

Yu Guo, Cameron Smith, Miloš Hašan, Kalyan Sunkavalli, and Shuang Zhao. 2020. MaterialGAN: Reflectance Capture Using a Generative SVBRDF Model. ACM Trans. Graph. 39, 6, Article 254 (Nov. 2020), 13 pages. https://doi.org/10.1145/3414685.3417779.

* cited by examiner

GENERATING DIGITAL MATERIALS FROM DIGITAL IMAGES USING A CONTROLLED DIFFUSION NEURAL NETWORK

BACKGROUND

Recent years have seen significant advancement in hardware and software platforms used for generating digital imagery, such as digital three-dimensional models. For example, digital materials have become very popular in the computer graphics industry (e.g., for use in movies, video games, architecture, or product visualization). These digital materials are often designed to portray a visual representation of an existing real-world material. Thus, in the field of material capture and generation, computer-implemented tools or models can be implemented to generate digital materials from photographs of real-world images.

SUMMARY

One or more embodiments described herein provide benefits and/or solve one or more problems in the art with systems, methods, and non-transitory computer-readable media that adapt a diffusion neural network for the flexible generation of digital materials from a single digital image. To illustrate, in one or more embodiments, a system uses a single environmentally-lit image as input to condition a diffusion neural network to generate a digital material via a controlled denoising process. In some cases, the diffusion neural network generates the digital material in the form of spatially varying bidirectional reflectance distribution functions (SVBRDFs) represented as a collection of two-dimensional texture maps. In some embodiments, the system further implements noise rolling, inpainting, multi-scale diffusion, and/or patched decoding for tileable, high-resolution material generation. In this manner, the system implements a model that flexibly operates within a domain having a wide variety of appearances—i.e., the materials and textures domain—to generate high-resolution digital materials that are useable in renderings as tiles without the appearance of seams.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
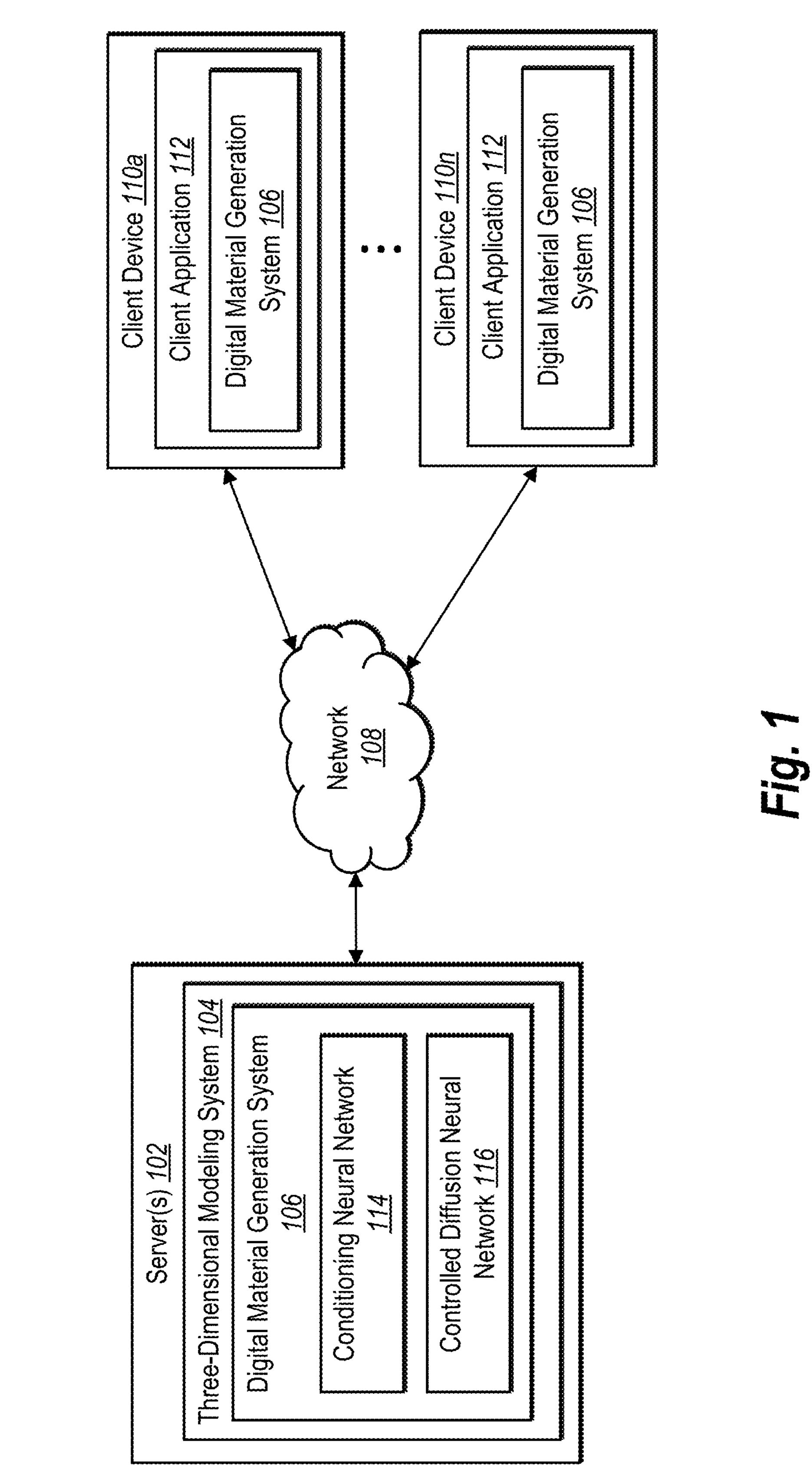
FIG. 1 illustrates an example environment in which a digital material generation system operates in accordance with one or more embodiments.

One or more embodiments described herein include a digital material generation system that flexibly generates tileable, high-resolution digital materials from input images via controlled denoising using a diffusion neural network. As indicated above, the field of material capture and generation implements various computer-implemented tools or models to generate digital materials from images of existing, real-world materials. The systems that implement these tools or models, however, suffer from technological shortcomings that result in inflexible and inaccurate operation.

To illustrate, conventional material generation systems are typically inflexible in that they rely on limited models or tools for material generation. For example, many conventional systems rely on generative adversarial networks (GANs) for material generation. While GANs-based models perform well in structured domains (e.g., the domain of human faces) where variation is relatively limited, these models often struggle in domains with a larger variety of appearances, such as the materials and textures domain, at least partially due to their instability during training. Thus, to operate in these larger domains, conventional systems often must employ multiple GANs-based models where each model is trained to specialize in a particular category of appearances within the domain. Further, many conventional systems models tend to produce digital materials having a low resolution and/or digital materials that are not tileable, limiting their application in graphical renderings.

Additionally conventional material generation systems often fail to operate accurately. In particular, conventional systems often fail to generate digital materials that accurately reproduce the appearance of materials portrayed in input images. Indeed, many conventional systems fail to generate digital materials that accurately reproduce the material properties, including the mesostructure, captured by the input images.

As suggested, in one or more embodiments, the digital material generation system generates digital materials from input images using a controlled diffusion neural network. For instance, in some embodiments, the digital material generation system employs a conditioning neural network to control the denoising process of a diffusion neural network based on an input image. Thus, via the diffusion neural network, the digital material generation system generates a digital material that reflects the contents of the input image. In some cases, the digital material generation system further rolls and unrolls the noise used throughout the denoising process, recreates a portion (e.g., the border) of the input image via inpainting, employs multi-scale diffusion, and/or uses patched decoding to generate tileable and high-resolution digital materials.

To illustrate, in one or more embodiments, the digital material generation system receives a digital image portraying a scene to be replicated as a digital material. Using a conditioning neural network, the digital material generation system generates a spatial condition from the digital image. The digital material generation system further uses a controlled diffusion neural network to generate a plurality of material maps corresponding to the scene portrayed by the digital image based on the spatial condition.

As indicated above, in one or more embodiments, the digital material generation system uses a controlled diffusion neural network to generate digital materials from input digital images. In particular, in some embodiments, the digital material generation system conditions a diffusion neural network to generate a digital material using an input digital image. In other words, the digital material generation system uses the input digital image to control or guide the denoising process implemented by the diffusion neural network.

Indeed, in some embodiments, the digital material generation system uses the controlled diffusion neural network to generate a digital material from noise. For instance, in some cases, the digital material generation system samples from a noise distribution (e.g., a normal distribution). The digital material generation system further uses the controlled diffusion neural network to denoise the sample and generate a digital material. In some instances, the noise sample includes a noised latent tensor. Thus, the digital material generation system uses the controlled diffusion neural network to generate a denoised latent tensor and generates the digital material from the denoised latent tensor.

As mentioned, in some implementations, the digital material generation system conditions the denoising process of the controlled diffusion neural network using a conditioning neural network. For instance, in certain embodiments, the digital material generation system uses the conditioning neural network to generate a spatial condition from an input digital image, where the input digital image portrays a scene to be replicated as a digital material. The digital material generation system further provides the spatial condition to the controlled diffusion neural network to facilitate the generation of the digital material.

In some cases, the digital material generation system employs noise rolling at each step of the denoising process. Indeed, in some implementations, the controlled diffusion neural network iteratively denoises the sample of the noise distribution (e.g., the noised latent tensor) via multiple diffusion steps. In some cases, the digital material generation system rolls the noise sample using a translation factor at the beginning of each diffusion step and unrolls the noise via an inverse process at the end of each diffusion step.

Additionally, in some instances, the digital material generation system employs inpainting in generating digital materials. To illustrate, in some embodiments, the digital material generation system uses a binary mask to mask a portion (e.g., the border) of the input digital image. The digital material generation system further uses the controlled diffusion neural network to regenerate the portion when generating the digital material. In some cases, when combined with noise rolling, the inpainting ensures tileability of the resulting digital material.

In one or more embodiments, the digital material generation system employs a multi-scale diffusion process for generating digital materials. Indeed, in some cases, the digital material generation system uses the controlled diffusion neural network to execute the denoising process at various scales (e.g., resolutions). For example, in some embodiments, the digital material generation system blends data extracted via diffusion steps executed at a lower scale with data at the current scale and uses the controlled diffusion neural network to process the blended data.

Further, in some embodiments, the digital material generation system employs patched decoding for generating digital materials. In particular, the digital material generation system decodes the denoised sample (e.g., the denoised latent tensor) in patches. In some instances, the digital material generation system decodes overlapping patches and/or uses a low-resolution decoding to prevent seams in the resulting digital material.

As further mentioned, in one or more embodiments, the digital material generation system generates digital materials by generating material maps. In particular, in some cases, the digital material generation system generates a plurality of material maps that collectively represent a digital material. For instance, in some embodiments, the digital material generation system generates a set of material maps from an input digital image where each material map reflects some property of the digital material (e.g., digitally replicates a property of the scene portrayed by the input digital image). As such, in some implementations, the digital material generation system uses the material maps to create a graphical element that includes the digital material.

The digital material generation system provides advantages over conventional systems. For example, the digital material generation system operates with improved flexibility when compared to conventional systems. In particular, by adapting a controlled diffusion neural network to the materials and textures domain, the digital material generation system flexibly operates within a domain that has been largely out of reach of conventional systems employing GANs-based models due to their inability to reproduce a large variety of appearances. Indeed, the controlled diffusion neural networks is more stable than GANs-based models; thus, the digital material generation system is more robust in the variety of materials that can be generated when compared to conventional systems. Further by implementing noise rolling, inpainting (e.g., border inpainting), multi-scale diffusion, and/or patched decoding, the digital material generation system flexibly generates digital materials that have a high resolution and/or are tileable.

The digital material generation system further operates with improved accuracy when compared to conventional systems. In particular, the digital material generation system generates digital materials that more accurately reproduce the appearance of materials portrayed in input images. Indeed, the digital material generation system more accurately reproduces material properties, such as the mesostructured, captured by the input images.

Additional detail regarding the digital material generation system will now be provided with reference to the figures. For example, FIG. 1 illustrates a schematic diagram of an exemplary system 100 in which a digital material generation system 106 operates. As illustrated in FIG. 1, the system 100 includes a server(s) 102, a network 108, and client devices 110*a*-110*n*.

Although the system 100 of FIG. 1 is depicted as having a particular number of components, the system 100 is capable of having any number of additional or alternative components (e.g., any number of servers, client devices, or other components in communication with the digital material generation system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 15). Moreover, the server(s) 102 and the client devices 110*a*-110*n* include one or more of a variety of computing devices (including one or more computing devices as discussed in greater detail with relation to FIG. 15).

As mentioned above, the system 100 includes the server(s) 102. In one or more embodiments, the server(s) 102 generates, stores, receives, and/or transmits data, including digital images and digital materials (e.g., digital materials generated from digital images). In one or more embodiments, the server(s) 102 comprises a data server. In some implementations, the server(s) 102 comprises a communication server or a web-hosting server.

In one or more embodiments, the three-dimensional modeling system 104 generates and/or edits digital three-dimensional models. For example, in some instances, the three-dimensional modeling system 104 generates a digital three-dimensional model (e.g., in response to user input for designing the three-dimensional model). In some cases, the three-dimensional modeling system 104 further modifies the digital three-dimensional model by applying a digital material. To illustrate, in some embodiments, the three-dimensional modeling system 104 tiles a digital material across at least a portion of the digital-three-dimensional model.

In one or more embodiments, the client devices 110*a*-110*n* include computing devices that generate or modify digital materials and/or use digital materials to generate graphical elements, such as digital three-dimensional models. For example, the client devices 110*a*-110*n* include one or more of smartphones, tablets, desktop computers, laptop computers, head-mounted-display devices, and/or other electronic devices. In some instances, the client devices 110*a*-110*n* include one or more applications (e.g., the client application 112) that generate or modify digital materials and/or use digital materials to generate graphical elements, such as digital three-dimensional models. For example, in one or more embodiments, the client application 112 includes a software application installed on the client devices 110*a*-110*n*. Additionally, or alternatively, the client application 112 includes a web browser or other application that accesses a software application hosted on the server(s) 102 (and supported by the three-dimensional modeling system 104).

To provide an example implementation, in some embodiments, the digital material generation system 106 on the server(s) 102 supports the digital material generation system 106 on the client device 110*n*. For instance, in some cases, the digital material generation system 106 on the server(s) 102 generates or learns parameters for the conditioning neural network 114 and the controlled diffusion neural network 116. The digital material generation system 106 then, via the server(s) 102, provides the conditioning neural network 114 and the controlled diffusion neural network 116 to the client device 110*n*. In other words, the client device 110*n* obtains (e.g., downloads) the conditioning neural network 114 and the controlled diffusion neural network 116 (e.g., with any learned parameters) from the server(s) 102. Once downloaded, the digital material generation system 106 on the client device 110*n* utilizes the conditioning neural network 114 and the controlled diffusion neural network 116 to generate digital materials from digital images independent from the server(s) 102.

In alternative implementations, the digital material generation system 106 includes a web hosting application that allows the client device 110*n* to interact with content and services hosted on the server(s) 102. To illustrate, in one or more implementations, the client device 110*n* accesses a software application supported by the server(s) 102. The client device 110*n* provides input to the server(s) 102, such as a digital image to be used in generating a digital material. In response, the digital material generation system 106 on the server(s) 102 generates a digital material from the digital image. The server(s) 102 then provides the digital material to the client device 110*n* for display and/or uses the digital material to generate a graphical element, such as a three-dimensional model.

Indeed, the digital material generation system 106 is able to be implemented in whole, or in part, by the individual elements of the system 100. Indeed, although FIG. 1 illustrates the digital material generation system 106 implemented with regard to the server(s) 102, different components of the digital material generation system 106 are able to be implemented by a variety of devices within the system 100. For example, one or more (or all) components of the digital material generation system 106 are implemented by a different computing device (e.g., one of the client devices 110*a*-110*n*) or a separate server from the server(s) 102 hosting the three-dimensional modeling system 104. Indeed, as shown in FIG. 1, the client devices 110*a*-110*n* include the digital material generation system 106. Example components of the digital material generation system 106 will be described below with regard to FIG. 13.

Figure 2:
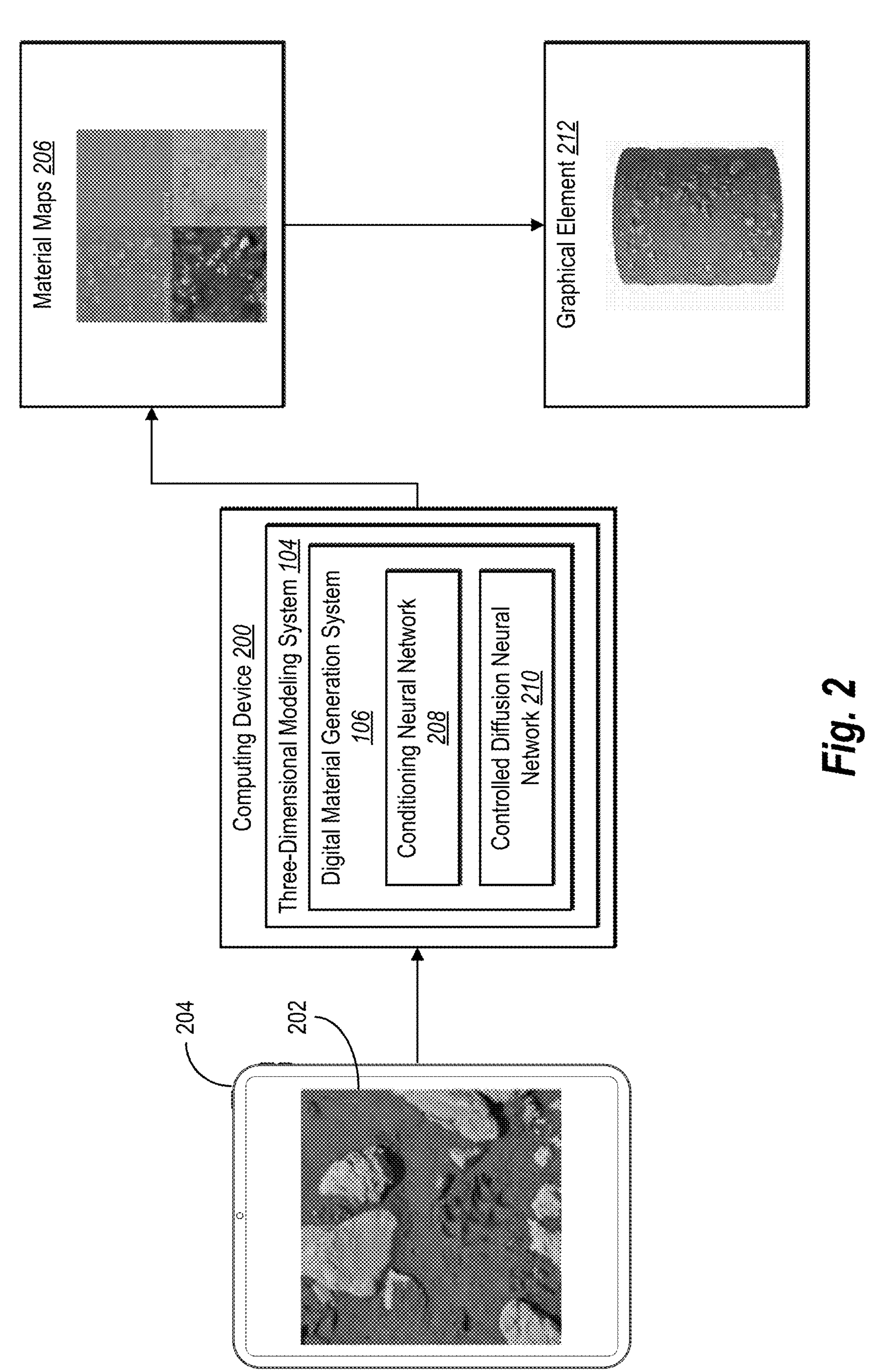
FIG. 2 illustrates an overview diagram of the digital material generation system generating a digital material from a digital image in accordance with one or more embodiments.

As mentioned above, in one or more embodiments, the digital material generation system 106 generates digital materials from digital images. FIG. 2 illustrates an overview diagram of the digital material generation system 106 generating a digital material from a digital image in accordance with one or more embodiments.

In one or more embodiments, a digital material includes a digitally rendered material. In particular, in some embodiments, a digital material includes a digital rendering of a scene (e.g., a portrayal of one or more objects, materials, and/or textures) that can be applied to a digital two-dimensional model or a digital three-dimensional model as a material. For example, in some cases, a digital material is applied as a surface or exterior of at least a portion of a digital two-dimensional object or a digital three-dimensional object. In some cases, a digital material includes a digital reproduction of an existing, real-world, scene.

Indeed, as shown in FIG. 2, the digital material generation system 106 (operating on a computing device 200) receives a digital image 202 from a client device 204. In some embodiments, the client device 204 captures the digital image 202 using a camera (e.g., an integrated camera). In some instances, the client device 204 retrieves the digital image 202 from local storage or accesses the digital image 202 from remote storage, such as through an online search engine or website. In some cases, the client device 204 receives the digital image 202 from another client device (e.g., as part of a text message or email).

As indicated by FIG. 2, the digital image 202 portrays a scene. In particular, the digital image 202 portrays a ground surface (e.g., an existing, real-world ground surface of dirt and rocks). Thus, in some cases, the digital material generation system 106 receives the digital image 202 to replicate the scene portrayed therein as a digital material.

As further shown in FIG. 2, the digital material generation system 106 generates material maps 206 from the digital image 202. Indeed, in some embodiments, the digital material generation system 106 generates a digital material in the form of one or more material maps.

In one or more embodiments, a material map includes a digital representation of a property of a digital material. For example, in some cases, a set of material maps collectively represents a digital material, and each material map in the set represents one or more properties of the digital material. For instance, in some embodiments, a material map includes data that maps at least one property of a digital material across a space (e.g., the space occupied by the digital material). In some cases, a material map includes data that digitally replicates a property of a scene—such as an existing, real-world scene—after which a digital material is to be modeled (e.g., a scene portrayed in a digital image). To illustrate, in some embodiments, a material map represents one or more properties including, but not limited to, base color, normal, height, roughness, or metalness. Thus, in some cases, a collection of maps forms a digital material and the collection of maps comprise one or more of a base color map, a normal map, a height map, a roughness map, or a metalness map. In one or more embodiments, a material map includes a spatially varying bidirectional reflectance distribution function (SVBRDF) map (e.g., a map defined by a spatially varying bidirectional reflectance distribution function). In some cases, the roughness property is related to the width of the SVBRDF specular lobe, where a lower roughness corresponds to a shinier material. In some instances, the metalness property defines which areas of a material correspond to raw metal.

As just mentioned, as a material map represents at least one property of a digital material, the digital material generation system 106 uses a plurality of material maps for a digital material in some implementations. In particular, the digital material generation system 106 generates a plurality of material maps that collectively represent a digital material in some cases. Indeed, as shown, the material maps 206 include a plurality of material maps. Additionally, each of the material maps shown in FIG. 2 correspond to the scene portrayed by the digital image 202. Thus, each of the material maps replicates a property of the scene that is different than the property replicated by one or more of the other material maps.

Though the material maps 206 shown in FIG. 2 include a particular combination of material maps, the digital material generation system 106 generates various combinations of material maps in various embodiments. Indeed, the digital material generation system 106 generates various numbers and types of material maps in different embodiments. For example, in certain embodiments, the digital material generation system 106 generates the material maps 206 by generating a base color map (e.g., a three-channel base color map), a normal map (e.g., a two-channel normal map), a height map, a roughness map, and a metalness map.

As illustrated in FIG. 2, the digital material generation system 106 generates the material maps 206 from the digital image 202 utilizing a conditioning neural network 208 and a controlled diffusion neural network 210. Using the conditioning neural network 208 and the controlled diffusion neural network 210 will be discussed in more detail below.

In one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, a multi-layer perceptron, or a diffusion neural network. In some embodiments, a neural network includes a combination of neural networks or neural network components.

In one or more embodiments, a conditioning neural network includes a computer-implemented neural network that conditions or controls the functioning of another neural network. In particular, in some embodiments, a conditioning neural network includes a neural network that generates a value or set of values that control, guide, or influence another neural network in generating its own output. For example, in some implementations, a conditioning neural network includes a computer implemented neural network that conditions or controls the denoising process of a diffusion neural network. Indeed, as will be explained below, in some cases, a conditioning neural network generates a value or set of values (e.g., from one or more inputs) that are used by a diffusion neural network during one or more of the diffusion steps implemented by the diffusion neural network to generate an output from noise.

In one or more embodiments, a controlled diffusion neural network includes a computer-implemented neural network that generates an output via a condition-based denoising process. In particular, in some embodiments, a controlled diffusion neural network includes a diffusion neural network that generates an output from noise based on a condition. In other words, the diffusion neural network uses the condition to control or guide the denoising process. For instance, in some cases, a controlled diffusion neural network accepts a condition generated by another neural network (e.g., a conditioning neural network) and performs a denoising process based on the condition.

As further shown in FIG. 2, the digital material generation system 106 generates a graphical element 212 using the material maps 206. In one or more embodiments, a graphical element includes a digital visual element. For instance, in some embodiments, a graphical element includes a digital two-dimensional model or a digital three-dimensional model. In some implementations, a graphical element includes an object that is within or a portion of a digital environment, but a graphical element exists outside such an environment in some instances (e.g., as a singular object). In one or more embodiments, the digital material generation system 106 uses the material maps 206 to generate the graphical element 212 by using the material maps 206 to apply the digital material to a surface or exterior of at least a portion of the graphical element 212.

Figure 3:
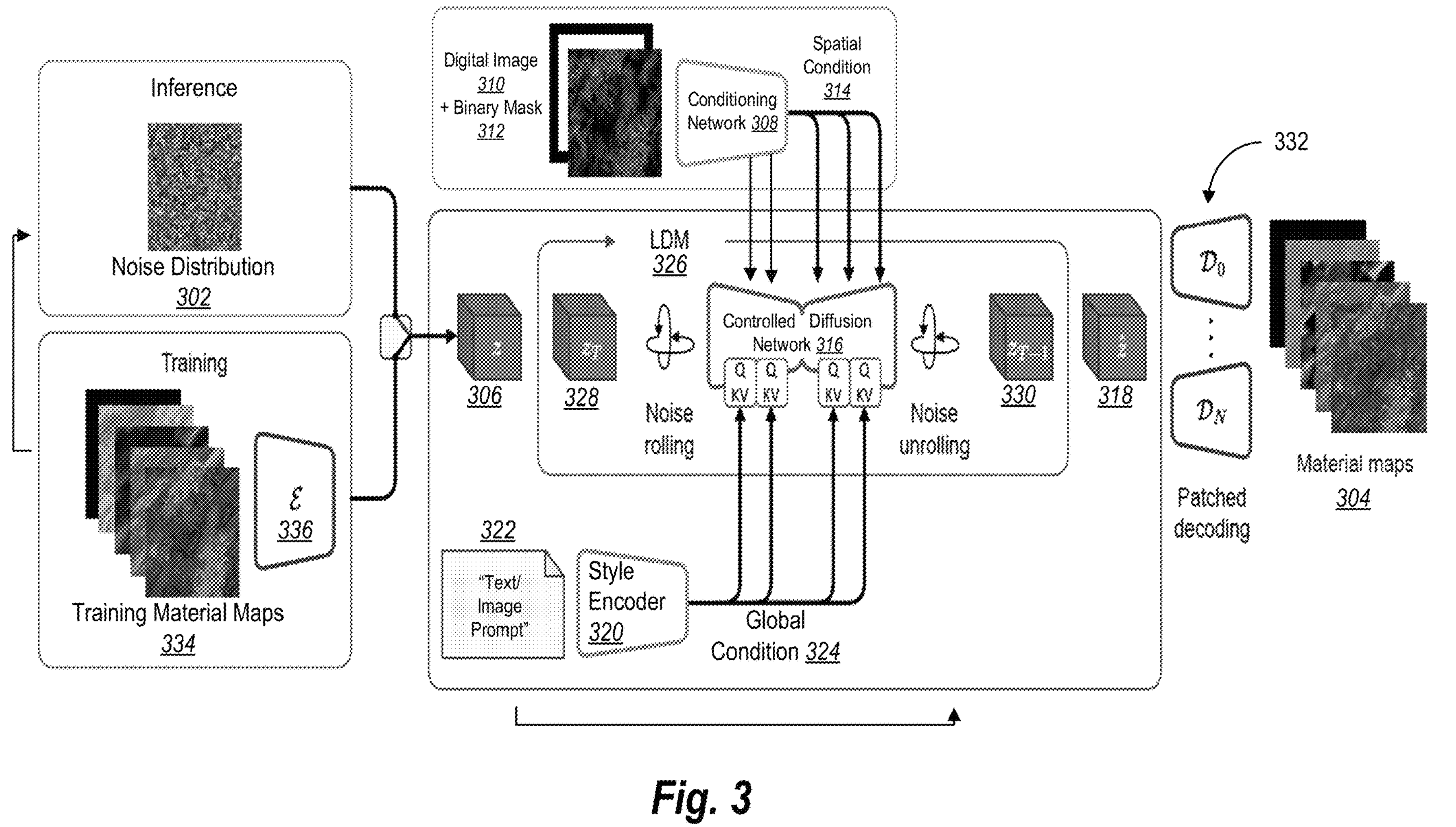
FIG. 3 illustrates the digital material generation system using a conditioning neural network and a controlled diffusion neural network to generate material maps from a digital image in accordance with one or more embodiments.

As previously mentioned, the digital material generation system 106 uses a conditioning neural network and a controlled diffusion neural network to generate material maps from digital images in some embodiments. FIG. 3 illustrates the digital material generation system 106 using a conditioning neural network and a controlled diffusion neural network to generate material maps from a digital image in accordance with one or more embodiments.

As shown in FIG. 3, the digital material generation system 106 generates material maps 304 from a noise distribution 302. In one or more embodiments, a noise distribution includes a distribution of noise. In particular, in some embodiments, a noise distribution includes a distribution of noise across one or more dimensions. Indeed, in some instances, a noise distribution is multi-dimensional, and the number of dimensions varies in different embodiments. In some implementations, a noise distribution includes one or more normal distributions, such as one or more Gaussian distributions, of noise. In one or more embodiments, a noise distribution corresponds to a latent space. For instance, as will be described in more detail below, in some cases, a noise distribution corresponds to a latent space used by the digital material generation system 106 as a latent representation of material maps.

As further shown in FIG. 3, the digital material generation system 106 determines a noised latent tensor 306 (represented as z) from the noise distribution 302. For instance, in some implementations, the digital material generation system 106 samples from the noise distribution 302 to determine the noised latent tensor 306.

In one or more embodiments, a latent tensor includes a set of values from a latent space. In some embodiments, a latent tensor includes a set of values representing or at least used as a representation of characteristics or attributes of other data within a latent space. For instance, in some implementations, a latent tensor includes a set of values representing or at least used as a representation of characteristics or attributes of a digital material (e.g., of one or more material maps corresponding to the digital material) within a latent space.

In one or more embodiments, a noised latent tensor includes a latent tensor from a latent space corresponding to a noise distribution. In particular, in some embodiments, a noised latent tensor includes a latent tensor having noise included therein. In some implementations a noised latent tensor includes a latent tensor determined by sampling a noise distribution, as suggested above. In some instances, however, a noised latent tensor includes a latent tensor that has had some of its noise removed, but still includes at least some noise. For example, in some embodiments, a noised latent tensor includes a latent tensor that includes at least some noise and has not completed a denoising process.

In contrast, in one or more embodiments, a denoised latent tensor includes a latent tensor that has had noise removed. In particular, in some embodiments, a denoised latent tensor includes a latent tensor that (e.g., initially) included some noise but has had the noise removed. For instance, in some cases, a denoised latent tensor includes a latent tensor that has completed a denoising process (e.g., executed by a diffusion neural network). In some instances, a denoised latent tensor still includes some noise (e.g., residual noise) but has completed the denoising process.

As further illustrated in FIG. 3, the digital material generation system 106 provides a digital image 310 to a conditioning neural network 308. In one or more embodiments, the digital image 310 portrays a scene to be replicated as a digital material. As further shown, the digital material generation system 106 provides a binary mask 312 to the conditioning neural network 308. In one or more embodiments, the digital material generation system 106 concatenates the digital image 310 and the binary mask 312 along the channel dimension. As illustrated in FIG. 3, the conditioning neural network 308 generates a spatial condition 314 from the digital image 310 and the binary mask 312. In some cases, the digital material generation system 106 provides the digital image 310 to the conditioning neural network 308 without the binary mask 312. Accordingly, in some implementations, the conditioning neural network 308 generates the spatial condition 314 from the digital image 310 (but not the binary mask 312). The use of the binary mask 312 will be described in more detail below.

In one or more embodiments, a spatial condition includes a value or set of values that provide a spatial (e.g., local) guidance for generating a neural network output. For instance, in some cases, a spatial condition includes a value or set of values that locally constrain or direct the output of a neural network or otherwise indicate a target for the local content of the output of the neural network. To illustrate, in some embodiments, a spatial condition includes a value or set of values generated from one or more spatial conditioning inputs (e.g., a digital image and/or a binary mask), the value(s) directing a neural network to generate one or more outputs based on the localized information provided by the spatial conditioning input(s) (e.g., the localized content of the spatial conditioning input(s)). In some implementations, a spatial condition is represented within a one or more feature maps.

To illustrate, in one or more embodiments, the conditioning neural network 308 includes an encoder, such as a convolutional encoder. In some instances, the conditioning neural network 308 includes additional components or layers. In some instances, the conditioning neural network 308 receives a four-channel input (e.g., that includes the digital image 310 and the binary mask 312). The conditioning neural network 308 uses the encoder $\varepsilon_c$ to encode its inputs to the same dimension as the noise that will be processed in generating the material maps 304. For instance, in some cases, given an input $c_i \in \mathbb{R}^{H \times W \times 4}$, the conditioning neural network 308 uses the encoder to generate a set of feature maps $c_f = \varepsilon_c(c_i)$ with $c_f \in \mathbb{R}^{h \times w \times c}$ and uses the set of feature maps to generate the spatial condition 314. In one or more embodiments, the digital material generation system 106 uses, as the conditioning neural network 308, the control network ("ControlNet") described by Lvmin Zhang and Maneesh Agrawala, *Adding Conditional Control to Text-to-image Diffusion Models*, arXiv:2302.05543, 2023, which is incorporated herein by reference in its entirety.

Indeed, as shown in FIG. 3, the digital material generation system 106 uses a controlled diffusion neural network 316 to generate a denoised latent tensor 318 (represented as $\hat{z}$) based on the spatial condition 314. In particular, the digital material generation system 106 uses the controlled diffusion neural network 316 to generate the denoised latent tensor 318 from the noised latent tensor 306 based on the spatial condition 314. Indeed, the digital material generation system 106 uses the controlled diffusion neural network 316 to denoise (e.g., remove the noise from) the noised latent tensor 306. Thus, the controlled diffusion neural network 316 uses the spatial condition 314 as a spatial constraint or guide during the denoising process.

In one or more embodiments, the digital material generation system 106 uses, as the controlled diffusion neural network 316, the U-net model described by Olaf Ronneberger et al., *U-net: Convolutional Networks for Biomedical Image Segmentation*, Medical Image Computing and Computer-Assisted Intervention—MICCAI 2015: 18$^{th}$ International Conference, Munich, Germany, 234-241, 2015, which is incorporated herein by reference in its entirety. For instance, in some embodiments, the digital material generation system 106 uses the U-net model to perform denoising as described by Robin Rombach et al., *High-resolution Image Synthesis with Latent Diffusion Models*, Proceedings of the IEEE/CVF Conference on Computer Vision and Pattern Recognition, 10684-0695, 2022, which is incorporated herein by reference in its entirety.

As further shown in FIG. 3, the digital material generation system 106 further provides an additional input 322 (e.g., a text input and/or an image input) to a style encoder 320. In one or more embodiments, the digital material generation system 106 uses, as the style encoder 320, the multi-domain style encoder described in U.S. patent application Ser. No. 17/652,390 filed on Feb. 24, 2022, entitled GENERATING ARTISTIC CONTENT FROM A TEXT PROMPT OR A STYLE IMAGE UTILIZING A NEURAL NETWORK MODEL, which is incorporated herein by reference in its entirety. As shown in FIG. 3, the style encoder 320 generates a global condition 324 from the additional input 322.

In one or more embodiments, a global condition includes a value or set of values that provide a global guidance for generating a neural network output. For instance, in some cases, a global condition includes a value or set of values generated that globally constrain or direct the output of a neural network or otherwise indicate a target for the global content of the output of the neural network. To illustrate, in some embodiments, a global condition includes a value or set of values generated from one or more global conditioning inputs (e.g., a digital image and/or a text prompt), the value(s) directing a neural network to generate one or more outputs based on the globalized information provided by the global conditioning input(s) (e.g., a general style or theme indicated by the global conditioning input(s)).

As shown in FIG. 3, the controlled diffusion neural network 316 generates the denoised latent tensor 318 based on the global condition 324 as well as the spatial condition 314. Thus, in some cases, the controlled diffusion neural network 316 generates a denoised latent tensor from a noised latent tensor using a combination of spatial and global conditioning. In some embodiments, the controlled diffusion neural network 316 operates based on a spatial condition without using a global condition. In some implementations, the controlled diffusion neural network 316 operates based on a global condition without using a spatial condition.

To illustrate using the global condition 324, in one or more embodiments, the digital material generation system 106 uses cross-attention between the intermediate layers of the controlled diffusion neural network 316 and an embedding of the global condition 324. In some embodiments, the digital material generation system 106 defines the attention as follows:

$$\text{Attention}(Q, K, V) = \mathit{softmax}\left(\frac{QK^T}{\sqrt{d}}\right)V \tag{1}$$

In equation 1, $$Q = W_Q^i \cdot \tau_\theta(y)$$

where $\tau_\theta$ represents the style encoder 320 and y represents the global condition 324, $$K = W_K^i \cdot \varphi_i(z_t), \text{ and } V = W_v^i \varphi_i(z_t).$$

Here, $$\varphi_i(z_t) \in \mathbb{R}^{N \times d_\epsilon^i}$$

is the flattened intermediate representation of $\in_\theta$, and $$W_Q^i \in \mathbb{R}^{d \times d_\tau^i},\ W_K^i \in \mathbb{R}^{d \times d_\epsilon^i},\ W_V^i \in \mathbb{R}^{d \times d_\epsilon^i},$$

are learnable projection matrices.

As indicated by FIG. 3 (e.g., the circular arrow 326), in some embodiments, the controlled diffusion neural network 316 generates the denoised latent tensor 318 from the noised latent tensor 306 via an iterative denoising process. Indeed, in some embodiments, the controlled diffusion neural network 316 generates the denoised latent tensor 318 over a plurality of diffusion steps. Thus, as shown by FIG. 3, for a given diffusion step, the controlled diffusion neural network 316 processes a first latent tensor 328 (represented as $z_T$) to generate a second latent tensor 330 (represented as $z_{T-1}$), where the transition from T to T−1 represents a transition as part of a backward diffusion process $q(z_{t-1}|z_t)$. In some cases, while the first latent tensor 328 includes a noised latent tensor (as it has not completed the denoising process), the second latent tensor 330 may represent a noised latent tensor (e.g., if the denoising process has not finished) or a denoised latent tensor (e.g., if the denoising process is complete).

As further indicated in FIG. 3, in one or more embodiments the controlled diffusion neural network 316 performs noise rolling before each diffusion step and noise unrolling after each diffusion step. Noise rolling and noise unrolling will be discussed in more detail below.

Additionally, in one or more embodiments, the digital material generation system 106 implements patched diffusion via the controlled diffusion neural network 316. In other words, in some implementations, the digital material generation system 106 uses the controlled diffusion neural network 316 to generate a denoised latent tensor from a noised latent tensor in patches. In some cases, the digital material generation system 106 uses overlapping patches. In some implementations, by using noise rolling and unrolling, the digital material generation system 106 enables the controlled diffusion neural network 316 to perform patched diffusion while preventing the seams between patches (e.g., ensuring the consistency of the patches) in the final result.

As further indicated in FIG. 3, the digital material generation system 106 uses a decoder 332 to generate the material maps 304 from the denoised latent tensor 318. In particular, the digital material generation system 106 uses the decoder 332 to project the denoised latent tensor 318 to pixel space. As shown in FIG. 3, in some embodiments, the digital material generation system 106 uses the decoder 332 to generate the material maps 304 via patched decoding. Patched decoding will be discussed in more detail below. The digital material generation system 106 uses various decoders in different embodiments. For example, in some cases, the digital material generation system 106 uses, as the decoder 332, the decoder described in U.S. patent application Ser. No. 17/652,390. In some implementations, the digital material generation system 106 uses, as the decoder 332, the decoder of the variational auto-encoding (VAE) compression model described by Diederik P. Kingma and Max Welling, *Auto-encoding Variational Bayes*, arXiv: 1312.6114, 2013, which is incorporated herein by reference in its entirety.

As further indicated by FIG. 3, the digital material generation system 106 uses training material maps 334 to train the controlled diffusion neural network 316. Further, the digital material generation system 106 uses an encoder 336 to train the controlled diffusion neural network 316. In one or more embodiments, the digital material generation system 106 uses, as the encoder 336, one of the encoders described in U.S. patent application Ser. No. 17/652,390. In some embodiments, the digital material generation system 106 uses, as the encoder 336, the encoder of the VAE compression model described by Diederik P. Kingma and Max Welling.

In one or more embodiments, during training, the digital material generation system 106 uses the encoder 336 to learn a compact representation of the training material maps 334. To illustrate, the digital material generation system 106 uses the encoder 336 to learn to encode a set of N material maps $M=\{M_1, M_2, \ldots, M_N\}$ corresponding to a digital material. In some cases, such an encoding compressor a tensor $M \in \mathbb{R}^{H \times W \times C}$ into a latent representation $z=\varepsilon(M)$ where $\varepsilon$ represents the encoder 336, $z \in \mathbb{R}^{h \times w \times c}$, and c is the dimensionality of the encoded maps. In at least one implementation, the digital material generation system 106 sets $$h = \frac{H}{8},\ w = \frac{W}{8},$$

and c=14 to obtain a desirable compression/quality compromise.

In one or more embodiments, the digital material generation system 106 trains the encoder 336 using a pixel-space $L_2$ loss, a learned perceptual image patch similarity (LPIPS) loss, or a patch-based adversarial objective loss. In some instances, the digital material generation system 106 uses a combination of one or more of the above-mentioned loss functions in generating the encoder 336. In some implementations, the digital material generation system 106 uses one or more of the loss functions for each training material map separately. In some embodiments, the digital material generation system 106 follows the VAE regularization and imposes a Kullback-Leibler divergence penalty to allow the latent space to follow a normal distribution.

In one or more embodiments, the digital material generation system 106 trains the controlled diffusion neural network 316 to sample the latent space to which the encoder 336 encodes the training material maps 334. For instance, in some embodiments, the digital material generation system 106 generates noised latent tensors through a deterministic forward diffusion process $q(z_t|z_{t-1})$. The digital material generation system 106 trains the controlled diffusion neural network 316 to perform a backward diffusion process $q(z_{t-1}|z_t)$ by learning to effectively denoise a noised latent tensor and reconstruct its original content.

In some implementations, to learn to incorporate global conditioning, the digital material generation system 106 uses a pre-trained style encoder. Further, in some cases, the digital material generation system 106 uses the following training condition where LDM refers to a latent diffusion model (i.e., the controlled diffusion neural network 316):

$$L_{LDM} := \mathbb{E}_{\epsilon(x), y, \epsilon \sim N(0,1), t}\left[\|\epsilon - \epsilon_\theta(z_t, t, \tau_\theta(y))\|_2^2\right] \tag{2}$$

Further, in some embodiments, the digital material generation system 106 trains the conditioning neural network 308 separately from the controlled diffusion neural network 316. To illustrate, in some implementations, the digital material generation system 106 freezes the controlled diffusion neural network 316 and trains the conditioning neural network 308 while the controlled diffusion neural network 316 is frozen. In some cases, by training conditioning neural network 308 separately, the digital material generation system 106 allows for faster convergence and requires fewer computational resources to learn to incorporate the spatial conditioning. Further, in some cases, by training the conditioning neural network 308 and the controlled diffusion neural network 316 separately, the digital material generation system 106 allows the controlled diffusion neural network 316 to operate independently. Thus, in various embodiments, the digital material generation system 106 can use the controlled diffusion neural network 316 unconditionally, with a spatial condition, or with a global condition without the need for retraining.

In one or more embodiments, after the training, the digital material generation system 106 samples from a noise distribution as described above, uses the controlled diffusion neural network 316 to denoise the sample into a valid latent space point (e.g., based on a global condition generated by the style encoder 320 and/or a spatial condition generated by conditioning neural network 308), and decodes the denoised sample via the decoder 332 into material maps.

Figure 4A:
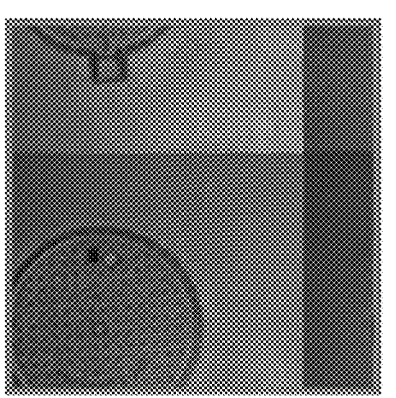
FIGS. 4A-4B illustrate visual representations of noise rolling in accordance with one or more embodiments.
Figure 4A:
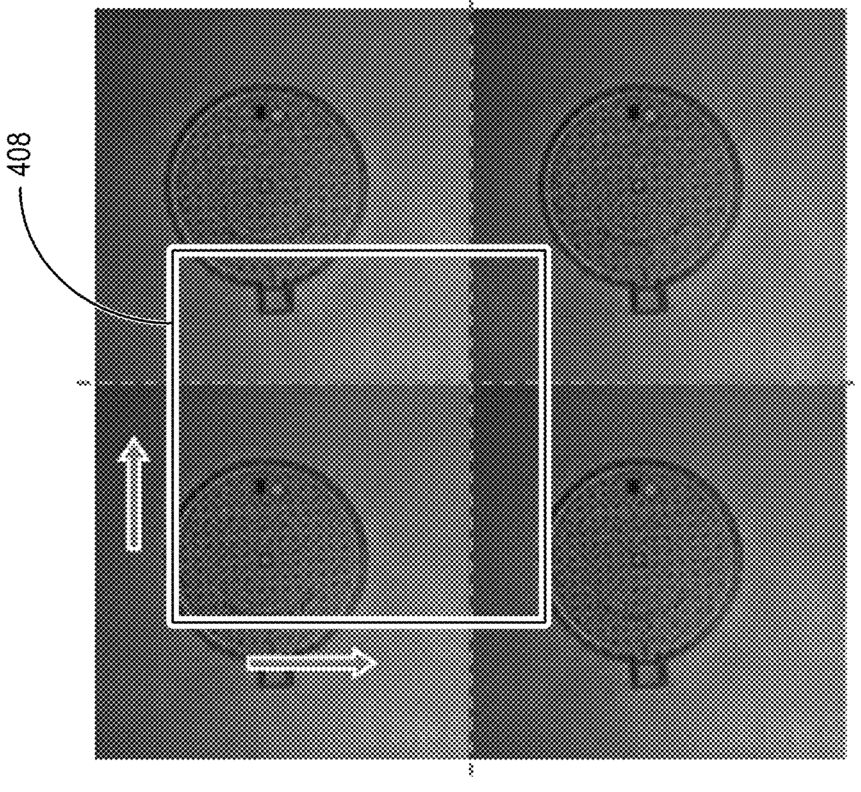
Figure 4A:
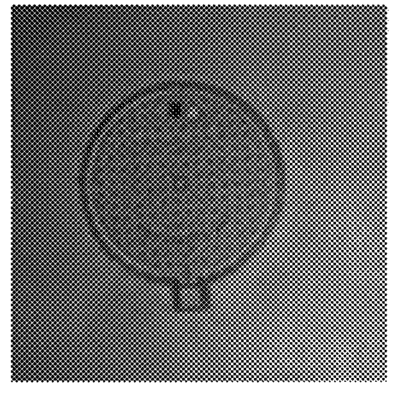
Figure 4B:
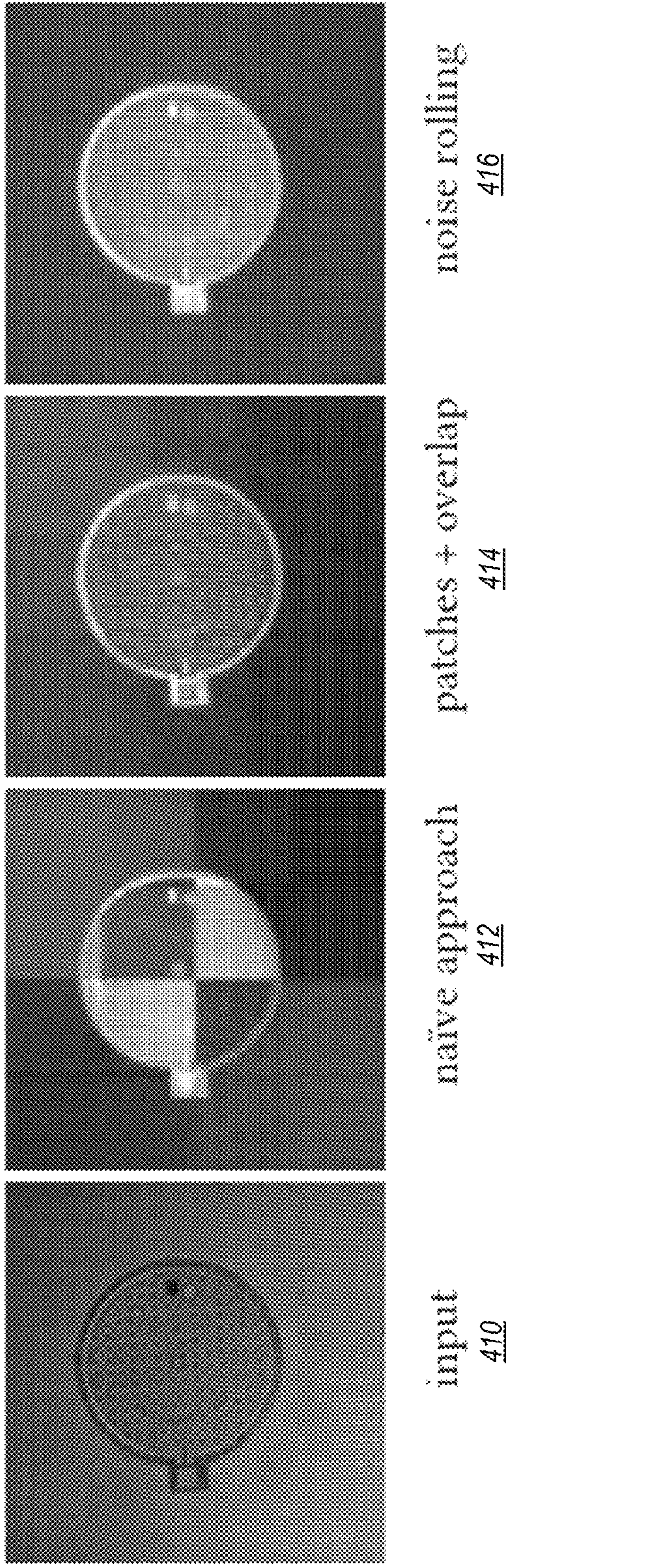

As previously mentioned, in one or more embodiments, the digital material generation system 106 implements noise rolling when generating material maps from digital images. In particular, the digital material generation system 106 rolls and unrolls the noise before and after each diffusion step, respectively, executed by a controlled diffusion neural network. FIGS. 4A-4B provide visual representations of noise rolling in accordance with one or more embodiments.

In particular, FIG. 4A illustrates an unrolled image 402, a rolled image 404, and a rolling process 406. As shown in FIG. 4A, the rolling process 406 involves rolling (e.g., translating) the unrolled image 402 over the x and y axes via a translation. In one or more embodiments, the digital material generation system 106 uses a translation factor to perform the translation. In some instances, the digital material generation system 106 determines the translation factor randomly or semi-randomly. In some cases, the digital material generation system 106 determines the translation factor via user input or learns the translation factor during training.

FIG. 4A represents the rolling process 406 by replicating the unrolled image 402 within a two-by-two grid and cropping the region within the border 408. Thus, the digital material generation system 106 generates the rolled image 404, where portions of the unrolled image 402 have been rearranged via the rolling process 406.

Similar to what is visually represented in FIG. 4A, the digital material generation system 106 rolls a noised latent tensor (creating a rolled noised latent tensor) before each diffusion step via a translation and unrolls the resulting rolled latent tensor at the end of each diffusion step. Thus, in some cases, the digital material generation system 106 rolls the noised latent tensor determined from a noise distribution before the first diffusion step of the controlled diffusion neural network and further rolls the partially processed noised latent tensor before each subsequent diffusion step until the denoising process is complete. Further, the digital material generation system 106 unrolls the partially process rolled noised latent tensor after each diffusion step and unrolls the rolled denoised latent tensor after the final diffusion step. In one or more embodiments, the digital material generation system 106 unrolls a rolled latent tensor via the inverse of the process described above (e.g., an inversion of the translation used to perform the noise rolling).

FIG. 4B illustrates the benefit of rolling and unrolling in accordance with one or more embodiments. In particular, FIG. 4B illustrates an input image 410, a material map 412 resulting from a naïve approach to patched diffusion (i.e., just patched diffusion without any additional features), a material map 414 resulting from patched diffusion using overlapping patches, and a material map 416 resulting from implementation of noise rolling.

Indeed, as previously mentioned, in one or more embodiments, the digital material generation system 106 executes patched diffusion via a controlled diffusion neural network. In some cases, by using patched diffusion, the digital material generation system 106 reduces the memory consumption of diffusing larger noise tensors. In some instances, using patched diffusion introduces artifacts in the output with visible seams as illustrated by the material map 412 that results from the naïve approach to diffusion. In some embodiments, the digital material generation system 106 mitigates the appearance of seams by using overlapping patches; however, this approach still leaves some visible seams and low frequency artifacts in many instances, as illustrated by the material map 414. Further, using overlapping patches typically involves the creation of more patches, requiring extra computation.

As shown by the material map 416, by implementing noise rolling, the digital material generation system 106 removes the seams that may otherwise appear during diffusion. In particular, via noise rolling, the digital material generation system 106 provides better consistency between patches, matching the statistics of the generated image at each diffusion step to match the learned distribution (e.g., the learned latent space). Further, as the learned distribution does not contain seams randomly placed in the images, noise rolling allows the digital material generation system 106 to generate tileable digital materials in an unconditioned or conditioned setting.

The patched diffusion with noise rolling algorithm presented below represents another characterization of the digital material generation system 106 executing diffusion steps with noise rolling in accordance with one or more embodiments.

| Algorithm |
| --- |

```
Data: T = 100, max_roll ≥ 0
Result: z
t ← 0;
z ← sample_noise( );
while t < T do
   r_x ← random(0, max_roll);
   r_y ← random(0, max_roll);
   z ← roll (z,(r_x, r_y));
   z ← patch_noise(z);
   z ← sample(z, t);
   z ← unpatch_noise(z);
   z ← roll (z, (−r_x, −r_y));
   t ← t + 1
End
```

Figure 5:
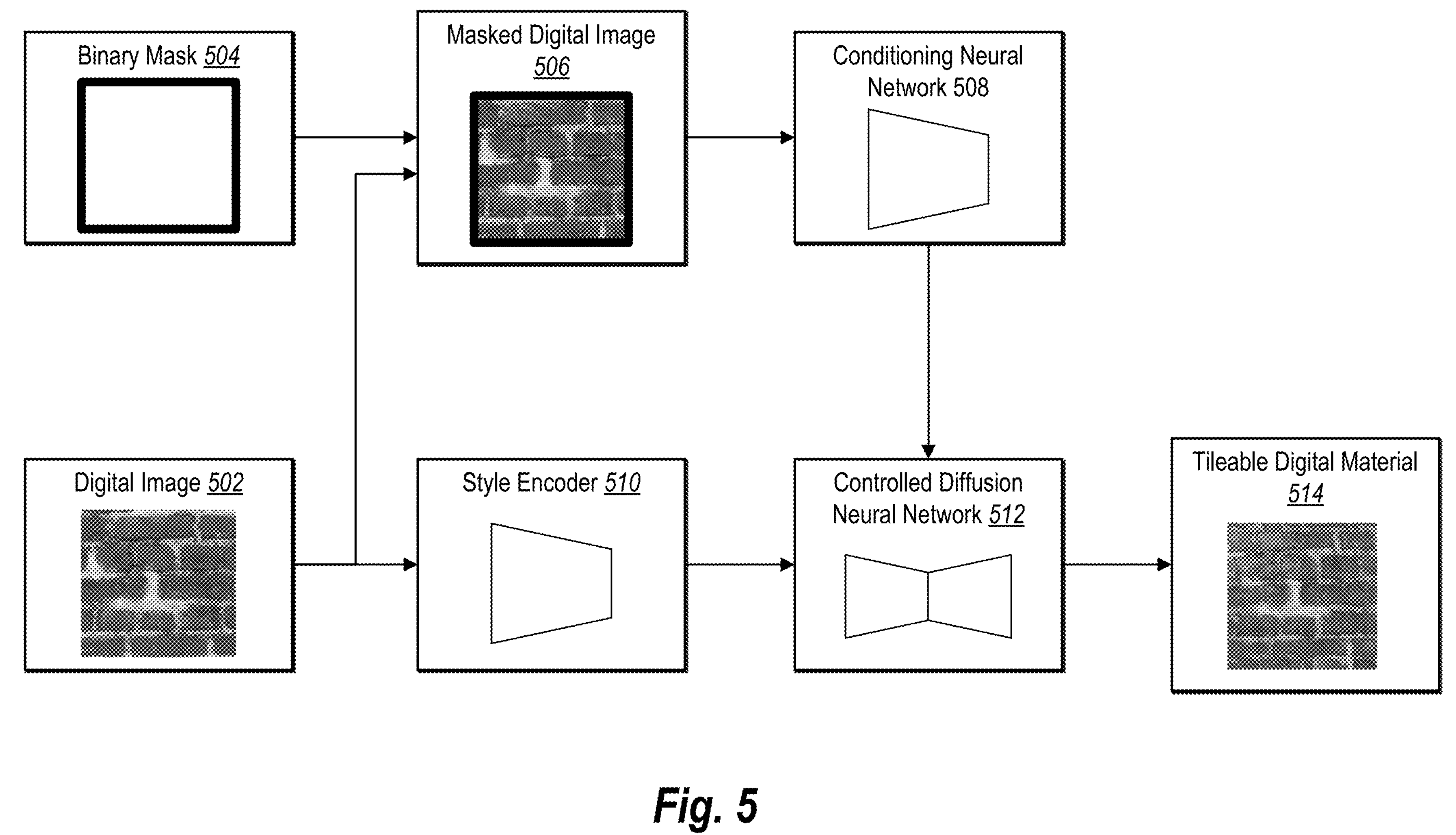
FIG. 5 illustrates the digital material generation system using inpainting when generating a digital material from a digital image in accordance with one or more embodiments.

As discussed, in some implementations, the digital material generation system 106 uses inpainting when generating digital materials from digital images. In particular, in some cases, the digital material generation system 106 incorporates inpainting into the denoising process. FIG. 5 illustrates the digital material generation system 106 using inpainting when generating a digital material from a digital image in accordance with one or more embodiments.

Indeed, as shown in FIG. 5, and as mentioned above, the digital material generation system 106 incorporates inpainting using a digital image 502 and a binary mask 504. As indicated, the digital material generation system 106 uses the digital image 502 and the binary mask 504 to create a masked digital image 506. As further shown by the masked digital image 506, the binary mask 504 masks a border of the digital image 502, though other portions of the digital image 502 can be masked in other embodiments. The amount of the border that is masked varies in different embodiments. For instance, in at least one instance, the digital material generation system 106 uses the binary mask 504 with a border size of 1/16 of the digital image 502. As shown in FIG. 5, the digital material generation system 106 uses a conditioning neural network 508 to process the masked digital image 506. The conditioning neural network 508 generates a spatial condition from the masked digital image 506 in some instances.

As further shown in FIG. 5, the digital material generation system 106 provides the digital image 502 to a style encoder 510. In some cases, the style encoder 510 generates a global condition from the digital image 502 as discussed above. Further, the digital material generation system 106 uses a controlled diffusion neural network 512 to generate a digital material (e.g., material maps) from the spatial condition generated by the conditioning neural network 508 and the global condition generated by the style encoder 510. In particular, as shown, the digital material generation system 106 uses the controlled diffusion neural network 512 to generate a tileable digital material 514.

Indeed, as shown, the digital material generation system 106 uses the controlled diffusion neural network 512 to regenerate the portion of the digital image 502 that is masked by the binary mask 504. Further, the digital material generation system 106 uses the digital image 502—unmasked—as a global condition to drive the regeneration of the masked portion so that the resulting digital material is coherent in its content and style. In particular, the encoding of the digital image 502 is provided to the controlled diffusion neural network 512 via cross-attention.

In one or more embodiments, the digital material generation system 106 trains the controlled diffusion neural network 512 to implement the inpainting by using random binary masks to mask the training digital images. For instance, in some cases, the digital material generation system 106 uses binary masks having a size (e.g., a border size) that ranges from zero to forty percent of the image size. In some cases, the digital material generation system 106 provides a random masking of the training digital image to the controlled diffusion neural network 512 for each diffusion step.

In one or more embodiments, the digital material generation system 106 combines the inpainting with the noise rolling discussed above. Indeed, in some cases, the digital material generation system 106 uses a combination of inpainting and noise rolling to ensure that the controlled diffusion neural network 512 generates a tileable digital material. In some cases, as the inpainted region is generated using a global condition, the resulting digital material is tileable due to the noise rolling. Further, as the inpainted region is on the border, the digital material generation system 106 ensures that the digital material can be tiled.

Figure 6:
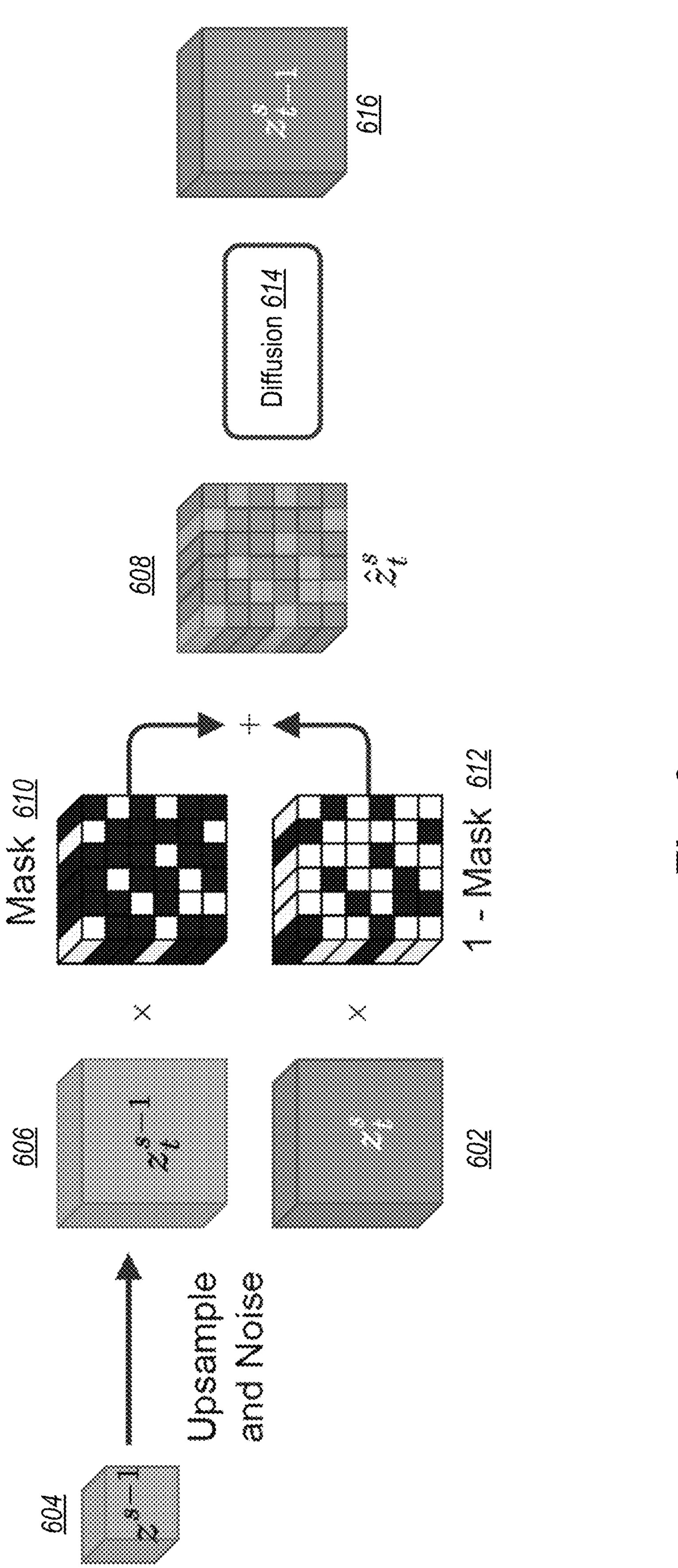
FIG. 6 illustrates the digital material generation system using multi-scale diffusion in generating digital materials in accordance with one or more embodiments.

As further mentioned above, in some embodiments, the digital material generation system 106 incorporates multi-scale diffusion when generating digital materials from digital images. FIG. 6 illustrates the digital material generation system 106 using multi-scale diffusion in generating digital materials in accordance with one or more embodiments.

Indeed, in some implementations, the digital material generation system 106 incorporates multi-scale diffusion by executing the denoising process at multiple scales. For instance, in some cases, the digital material generation system 106 uses a controlled diffusion neural network to execute the denoising process in at least a first resolution and a second resolution where the second resolution is higher than the first resolution. Thus, the digital material generation system 106 uses the controlled diffusion neural network to execute a plurality of low-resolution diffusion steps and a plurality of high-resolution diffusion steps. In some embodiments, the digital material generation system 106 uses the controlled diffusion neural network to execute the denoising process at more than two scales.

As shown in FIG. 6, the digital material generation system 106 blends the information determined during the denoising process at one resolution with the information determined during the denoising process for a higher resolution. The digital material generation system 106 uses the controlled diffusion neural network to process the resulting blended noise input during the denoising process for the higher resolution. Accordingly, the digital material generation system 106 leverages the information extracted at the lower resolution to estimate low frequency geometries when diffusing at the higher resolution.

To illustrate, as shown in FIG. 6, for a given diffusion step t during the denoising process for scale s, the digital material generation system 106 identifies a noised latent tensor 602 (represented as $$z_t^s)$$

to be processed by the controlled diffusion neural network. Further, the digital material generation system 106 identifies a corresponding noised latent tensor 604 (represented as $z^{s-1}$) processed during the denoising process for a lower (e.g., immediately preceding) scale. For instance, in some cases, the digital material generation system 106 identifies the noised latent tensor that was processed during the corresponding diffusion step at the lower scale. Indeed, in some cases, the digital material generation system 106 uses the input noised latent tensor to the corresponding diffusion step. In some instances, the digital material generation system 106 uses the output of the corresponding diffusion step. As shown in FIG. 6, the digital material generation system 106 up-scales the corresponding noised latent tensor 604 to match the resolution of the noised latent tensor 602. Thus, the digital material generation system 106 generates an up-scaled noised latent tensor 606 (represented as $$z_t^{s-1}).$$

As further shown in FIG. 6, the digital material generation system 106 uses the noised latent tensor 602 and the up-scaled noised latent tensor 606 to generate a blended noise input 608 (represented as $$\hat{z}_t^s).$$

In particular, the digital material generation system 106 uses a masking operation to generate the blended noise input 608. For example, in some implementations, the digital material generation system 106 uses a binary masking operation as follows where m represents a binary mask:

$$\hat{z}_t^s = m \times z_t^s + (1 - m) \times z_t^{s-1} \tag{3}$$

Thus, as indicated by equation 3 and as shown in FIG. 6, the digital material generation system 106 uses a first binary mask 610 and a second binary mask 612 where the second binary mask 612 is an inverse of the first binary mask 610 and vice versa. As shown, the digital material generation system 106 applies the first binary mask 610 to the up-scaled noised latent tensor 606, applies the second binary mask 612 to the noised latent tensor 602, and combines the results to generate the blended noise input 608. As further shown in FIG. 6, the digital material generation system 106 processes the blended noise input 608 via a diffusion step 614 using the controlled diffusion neural network to generate the output latent tensor 616 (represented as $$z_{t-1}^s).$$

In one or more embodiments, the digital material generation system 106 generates new binary masks at each diffusion step. For instance, in some embodiments, the digital material generation system 106 generates a new binary mask (and a new inverse binary mask) with each pixel having a fifty percent chance of being masked for that diffusion step.

In some cases, the digital material generation system 106 completes the denoising process at a given resolution before beginning the denoising process for the next resolution. In some cases, the digital material generation system 106 uses information from a lower resolution for the first several diffusion steps of the denoising process at the next resolution. In some implementations, the digital material generation system 106 uses information from the lower resolution for every diffusion step of the denoising process at the next resolution.

In one or more embodiments, the digital material generation system 106 does not utilize a blended noise input as described above. Rather, the digital material generation system 106 uses the output of a denoising process for one resolution to execute the denoising process for the next, higher resolution. Indeed, in some cases, the digital material generation system 106 executes the denoising process at a first resolution to generate an output. The digital material generation system 106 further uses the output to execute the denoising process at a higher resolution and generate a higher-resolution output. The digital material generation system 106 can use the higher-resolution output to further execute the denoising process for one or more additional, yet higher resolutions. Thus, in some cases, the digital material generation system simplifies the multi-scale diffusion while still incorporating information extracted while executing the denoising process at the lower resolution.

By incorporating multi-scale diffusion, the digital material generation system 106 preserves low-resolution information while denoising at higher resolutions. Indeed, in some cases, generating material maps produces flat geometries when using the controlled diffusion neural network at higher resolutions than those used to train the model. In other words, the low-resolution information gets lost as the model operates at higher resolutions. By incorporating multi-scale diffusion as described above, however, the digital material generation system 106 can use the controlled diffusion neural network to generate high quality material maps at higher resolutions while maintaining the lower-resolution information.

Figure 7:
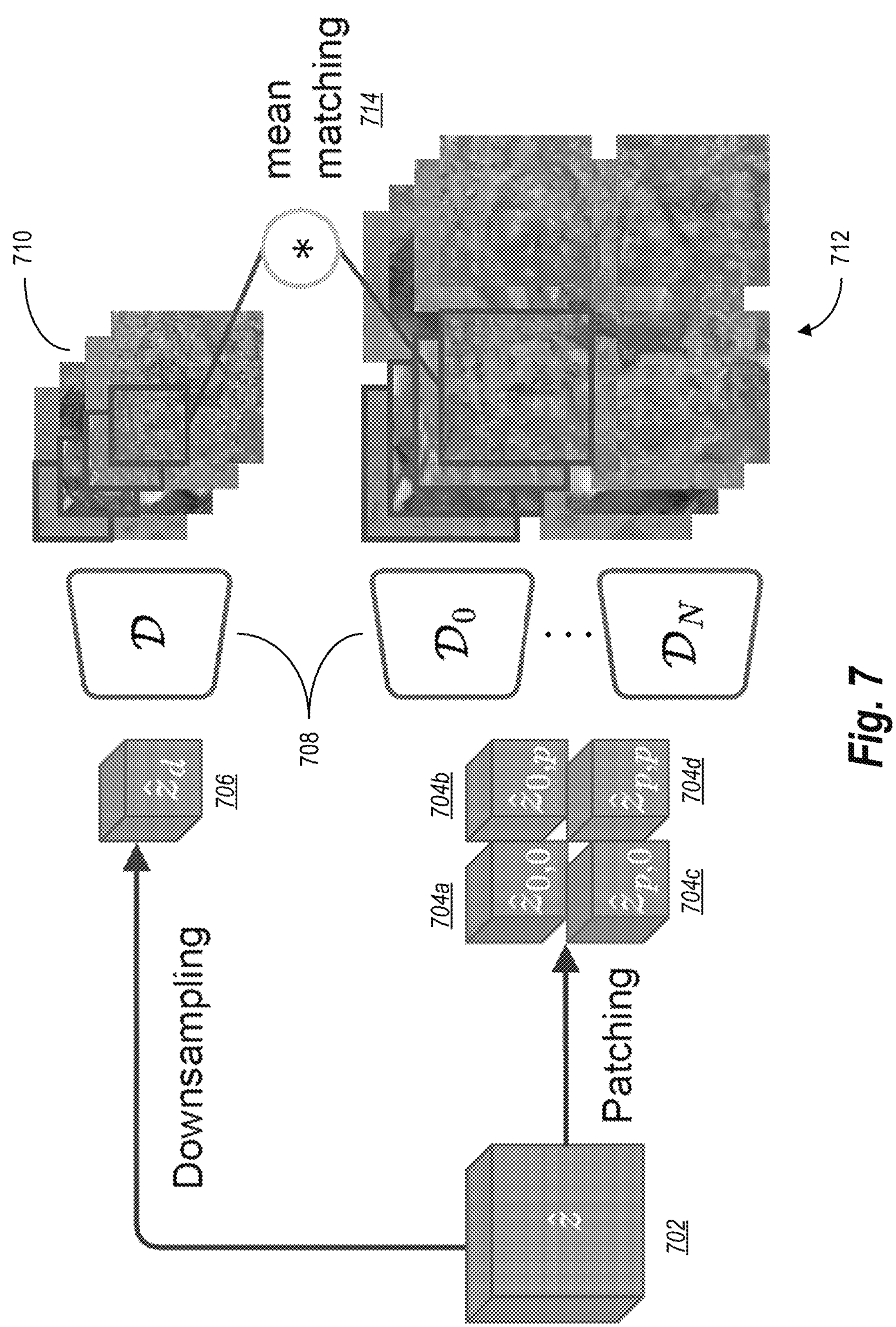
FIG. 7 illustrates the digital material generation system incorporating patched decoding in accordance with one or more embodiments.

As mentioned above, in some implementations, the digital material generation system 106 incorporates patched decoding when generating digital materials from digital images. Indeed, in some cases, the digital material generation system 106 incorporates patched diffusion and patched decoding. FIG. 7 illustrates the digital material generation system 106 incorporating patched decoding in accordance with one or more embodiments.

As shown in FIG. 7, the digital material generation system 106 obtains a denoised latent tensor 702 (represented as $\hat{z}$). For instance, in some cases, the digital material generation system 106 obtains the denoised latent tensor 702 by using a controlled diffusion neural network to generate the denoised latent tensor 702 from a noised latent tensor. As further shown, the digital material generation system 106 divides the denoised latent tensor 702 into patches 704*a*-704*d* (represented as $\hat{z}_{0,0}$, $\hat{z}_{0,p}$, $\hat{z}_{p,0}$, $\hat{z}_{p,p}$). Further, the digital material generation system 106 determines a low-resolution denoised latent tensor 706 corresponding to the denoised latent tensor 702. In particular, as indicated, the digital material generation system 106 down-samples the denoised latent tensor 702 to determine the low-resolution denoised latent tensor 706.

Additionally, as shown, the digital material generation system 106 uses a decoder 708 to decode the low-resolution denoised latent tensor 706. In particular, in some embodiments, the digital material generation system 106 decodes the low-resolution denoised latent tensor 706 in a single pass (e.g., without dividing the low-resolution denoised latent tensor 706 into patches). Thus, the digital material generation system 106 uses the decoder 708 to generate low-resolution material maps 710 from the low-resolution denoised latent tensor 706.

Further, as shown, the digital material generation system 106 uses the decoder 708 to decode the denoised latent tensor 702. In particular, as indicated, the digital material generation system 106 decodes the patches 704*a*-704*d* determined from the denoised latent tensor 702. Thus, the digital material generation system 106 uses the decoder 708 to generate material map patches 712 from the patches 704*a*-704*d*.

In one or more embodiments, the patches 704*a*-704*d* determined from the denoised latent tensor 702 include overlapping patches. Thus, in some cases, the material map patches 712 generated using the decoder 708 also include overlapping patches. In some implementations, the digital material generation system 106 blends the overlapping patches (e.g., the patches 704*a*-704*d* and/or the material map patches 712) using truncated Gaussian weights (e.g., via the decoder 708). For instance, in some cases, the digital material generation system 106 uses the truncated Gaussian weights to preserve the signal at the center of the patches and give a weight of zero at the borders.

As further shown in FIG. 7, the digital material generation system 106 employs a mean matching operation 714. In particular, the digital material generation system 106 uses the mean matching operation 714 to match the mean of each high-resolution patch (i.e., each of the material map patches 712) with the corresponding low-resolution patch (i.e., a corresponding patch from the low-resolution material maps 710).

Indeed, in some cases, the digital material generation system 106 incorporates patched decoding to reduce the memory requirements for generating material maps from a denoised latent tensor. In some instances, however, performing patched decoding naively leads to visible seams and inconsistency between patches within the final material maps. Thus, in some implementations, the digital material generation system 106 incorporates patched decoding as described above to reduce/eliminate the appearance of seams and/or ensure consistency between patches. Indeed, by decoding a low-resolution denoised latent tensor, and using the resulting low-resolution material maps to mean match with corresponding high-resolution material maps, the digital material generation system 106 encourages similarity of appearance among the various decoded patches. Further, by decoding overlapping patches and blending the patches with the truncated Gaussian weights, the digital material generation system 106 eliminates the appearance of any seams that may remain.

In one or more embodiments, by using the patched decoding as described above, the digital material generation system 106 enables the generation of high quality, high-resolution material maps. Indeed, in some cases, the digital material generation system 106 uses patched diffusion and patched decoding to enable the generation of material maps at an arbitrary resolution and modifies these processes as described above (e.g., via overlapping patches, mean matching, blending of patches, etc.) to reduce the appearance of artifacts or seams. Further, as discussed above, implementing multi-scale diffusion also reduces the appearance of artifacts and improves the maintenance of low-resolution data. Thus, in some implementations, the digital material generation system 106 combines patched decoding, patched diffusion, and multi-scale diffusion to generate higher quality material maps for arbitrary resolutions.

Accordingly, in some cases, the digital material generation system 106 operates more accurately when compared to conventional systems. For instance, as mentioned, taking a naïve approach to patched diffusion and patched decoding can lead to the appearance of artifacts and seams and can further result in outputs that fail to incorporate low-frequency detail. Thus, by incorporating multi-scale diffusion and patched decoding as described above, the digital material generation system 106 generates material maps that more accurately reflect an input image compared to conventional systems.

Further, the digital material generation system 106 operates more flexibly by adapting a diffusion neural network to the materials and textures domain. For example, by using a diffusion neural network, such as a controlled diffusion neural network, the digital material generation system 106 can generate material maps for a more robust set of materials when compared to conventional systems that employ GANs-based model, which typically have a more limited range. Further, by implementing features, such as noise rolling and inpainting (e.g., border inpainting), the digital material generation system 106 flexibly generates tileable digital images.

Figure 8:
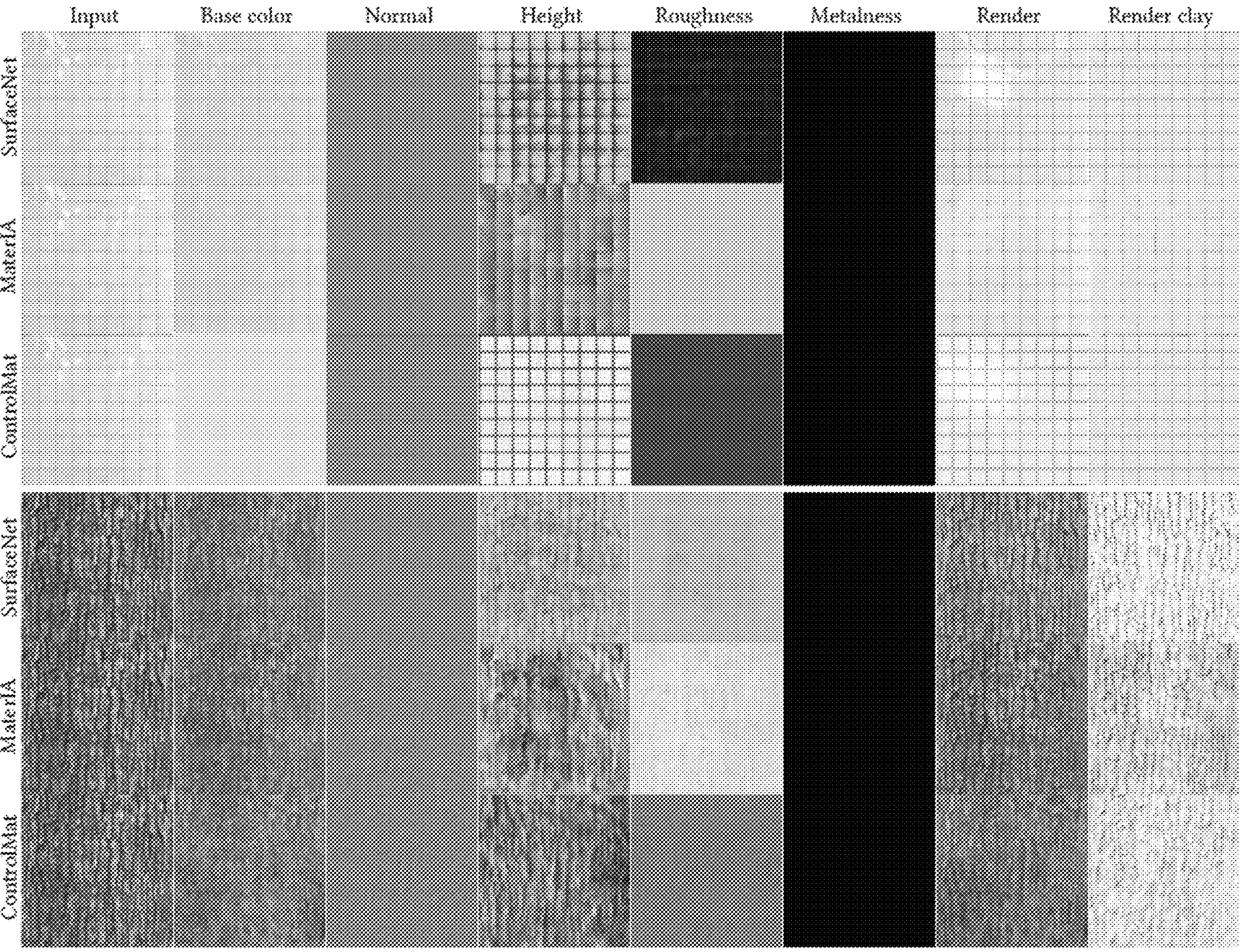
FIG. 8 illustrates graphical representations reflecting experimental results regarding the effectiveness of the digital material generation system in accordance with one or more embodiments.

Researchers have conducted studies to determine the effectiveness of the digital material generation system 106 in generating digital materials from digital images. FIG. 8 illustrates graphical representations reflecting experimental results regarding the effectiveness of the digital material generation system 106 in accordance with one or more embodiments.

The graphical representations shown in FIG. 8 compare the performance of at least one embodiment of the digital material generation system (labeled ControlMat) to the performance of several current state-of-the-art models. For instance, the graphical representations show the performance of the SurfaceNet model described by Giuseppe Vecchio et al., *SurfaceNet: Adversarial SVBRDF Generation from a Single Image*, Proceedings of the IEEE/CVF International Conference on Computer Vision, 12840-12848, 2021. The graphical representations further show the performance of the MaterIA model described by Rosalie Martin et al., *MaterIA: Single Image High-resolution Material Capture in the Wild*, Computer Graphics Forum 41, 163-177, 2022.

The graphical representations of FIG. 8 compare each tested model on generating material maps from real photographs. Indeed, FIG. 8 shows the digital image input to each tested model, various material maps generated from the digital image, and the resulting renderings. The graphical results indicate that the digital material generation system 106 is better able to recover high quality digital materials with less baked lighting and mesostructured in the results. Accordingly, the digital material generation system 106 performs better at separating the appearance provided by an input image from the surface geometry represented therein.

The researchers further conducted studies to determine the effectiveness of incorporating one or more of the features discussed above when generating digital materials from digital images (e.g., noise rolling, border inpainting, multi-scale diffusion, and patched decoding). FIGS. 9-12 illustrate graphical representations showing the effectiveness of these features in accordance with one or more embodiments.

Figure 9:
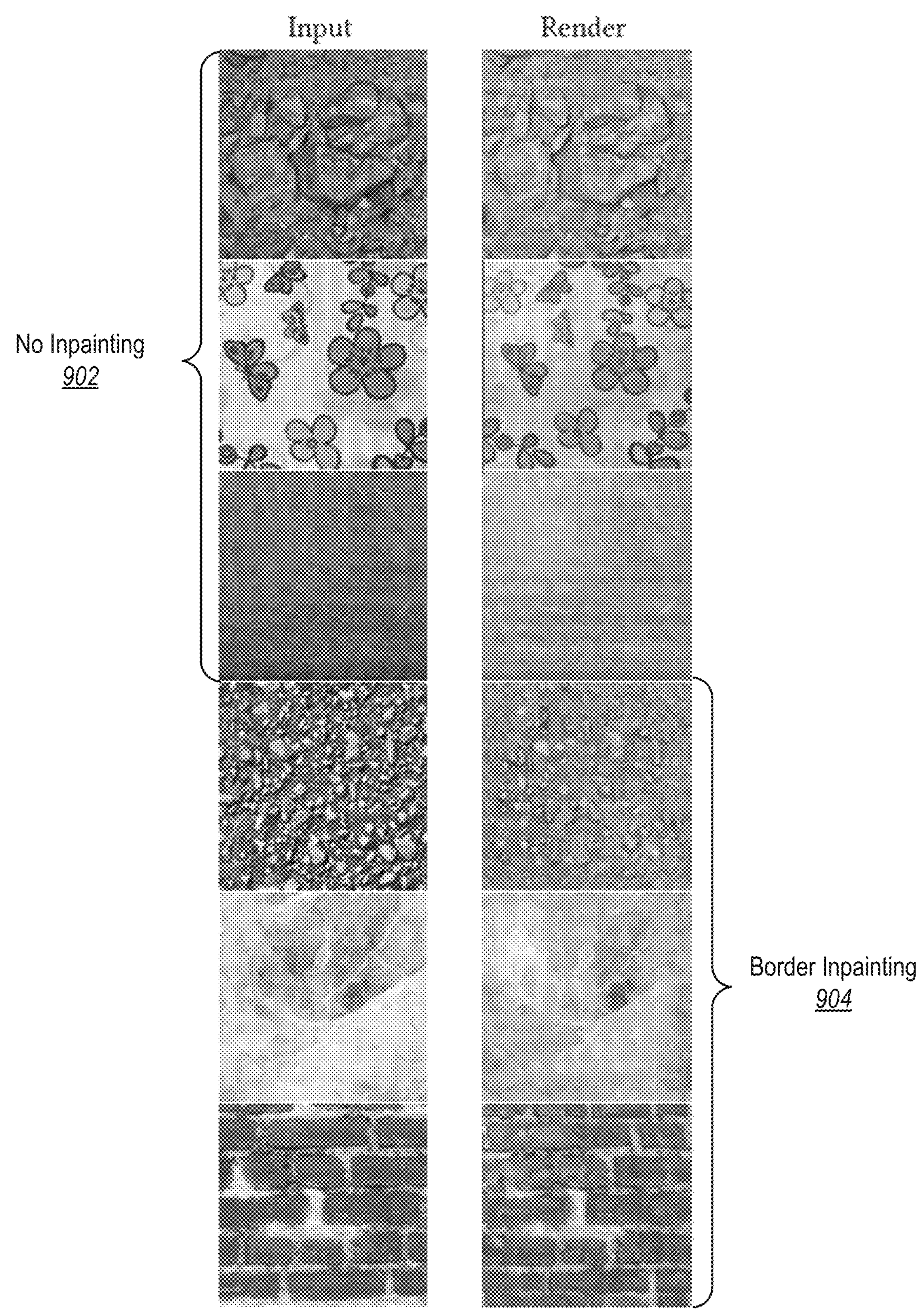
FIG. 9 illustrates graphical representations reflecting experimental results regarding the effectiveness of the digital material generation system when incorporating border inpainting in accordance with one or more embodiments.

In particular, FIG. 9 illustrates graphical representations reflecting experimental results regarding the effectiveness of the digital material generation system 106 when incorporating border inpainting in accordance with one or more embodiments. FIG. 9 shows various input digital images and the renderings generated from the resulting material maps. The first set of rows 902 shown in FIG. 9 illustrate results when the digital material generation system 106 does not incorporate border inpainting. As shown by the first set of rows 902, omitting border inpainting results in digital materials that cannot be tiled (e.g., tiling the digital materials would result in an incohesive and unpleasant appearance). The second set of rows 904 illustrate results when the digital material generation system 106 does incorporate border inpainting. As shown by the second set of rows 904, when incorporating the border inpainting, the digital material generation system 106 generates tileable digital materials from non-tileable input digital images. In other words, the digital materials resulting from the border inpainting would provide a cohesive appearance when tiled as their borders have been created to match one another.

Figure 10:
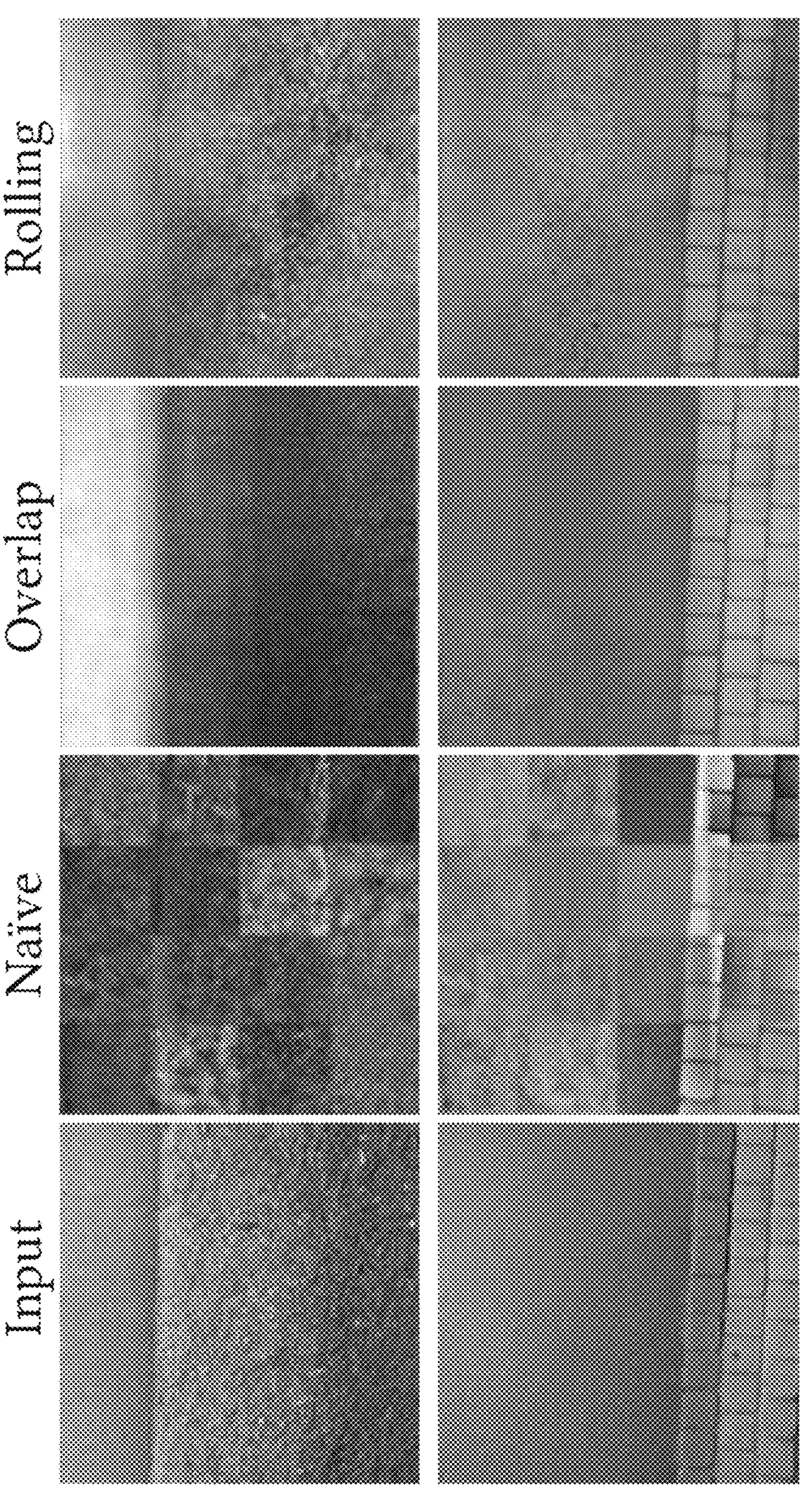
FIG. 10 illustrates graphical representations reflecting experimental results regarding the effectiveness of the digital material generation system when incorporating noise rolling in accordance with one or more embodiments.

FIG. 10 illustrates graphical representations reflecting experimental results regarding the effectiveness of the digital material generation system 106 when incorporating noise rolling in accordance with one or more embodiments. In particular, FIG. 10 shows the improvements provided when noise rolling is incorporated into a patched diffusion approach. The graphical representations show input digital images, results of a naïve approach to patched diffusion (i.e., without additional features), results of patched diffusion on overlapping patches, and results of patched diffusion with noise rolling. As shown, the naïve approach to patched diffusion leads to a plurality of incohesive patches that fail to match in brightness and further lead to the appearance of noticeable seams. Further, while using overlapping patches does mitigate some of these effects, seams are still visible between the patches. By using the noise rolling approach, the digital material generation system 106 eliminates the appearance of seams in the output.

Figure 11:
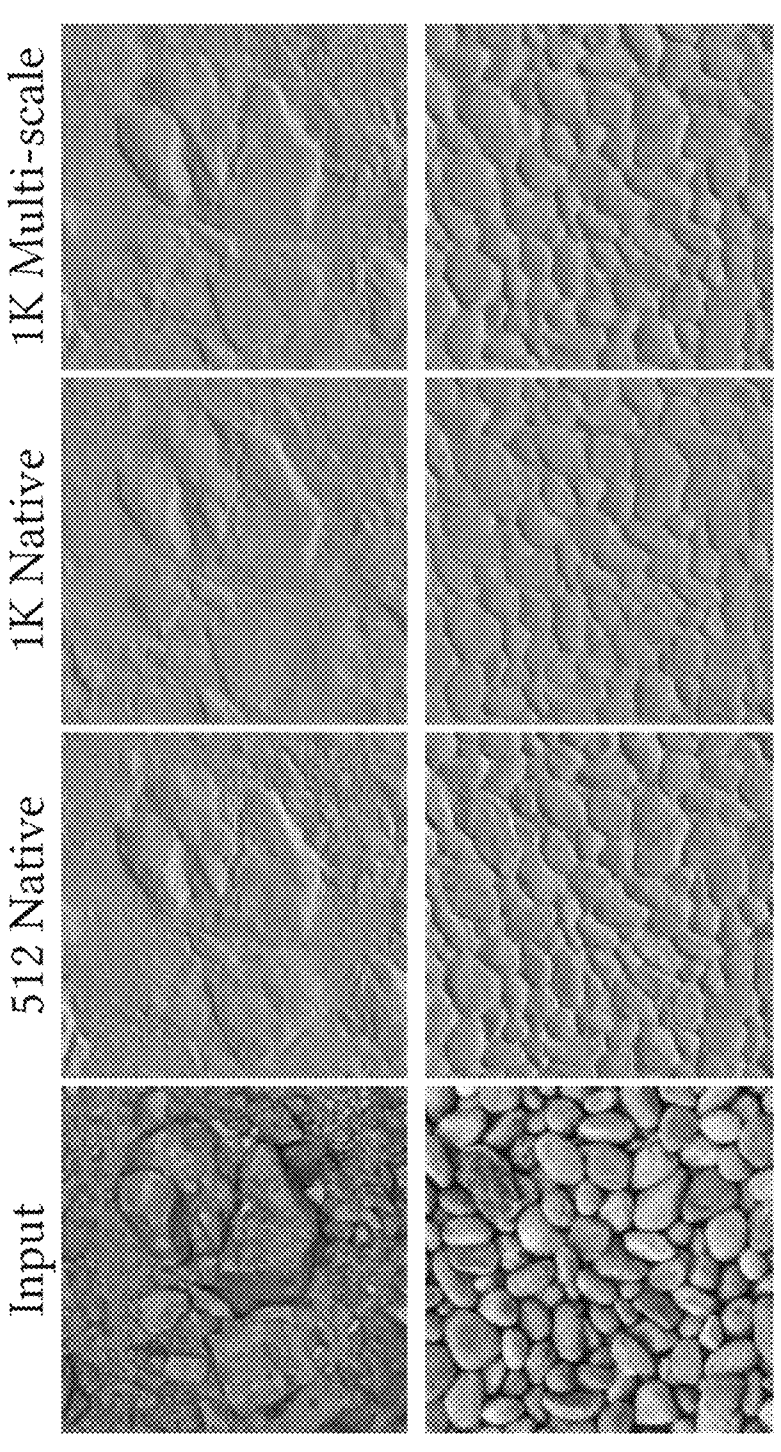
FIG. 11 illustrates graphical representations reflecting experimental results regarding the effectiveness of the digital material generation system when incorporating multi-scale diffusion in accordance with one or more embodiments.

FIG. 11 illustrates graphical representations reflecting experimental results regarding the effectiveness of the digital material generation system 106 when incorporating multi-scale diffusion in accordance with one or more embodiments. In particular, the graphical representations show input digital images and the results from diffusing at different resolutions. Comparing the results of diffusing at the 1K resolution reveals that incorporating multi-scale diffusion better captures detail and produces a material map that more accurately reflects the input image. Indeed, without multi-scale diffusion, geometries portrayed in the resulting material maps tend to appear flat, particular with larger elements, and lose details. Incorporating multi-scale diffusion, on the other hand, preserves the mesostructured portrayed in the input digital image, allowing the generation of material maps that better reflect the geometries of the input.

Figure 12:
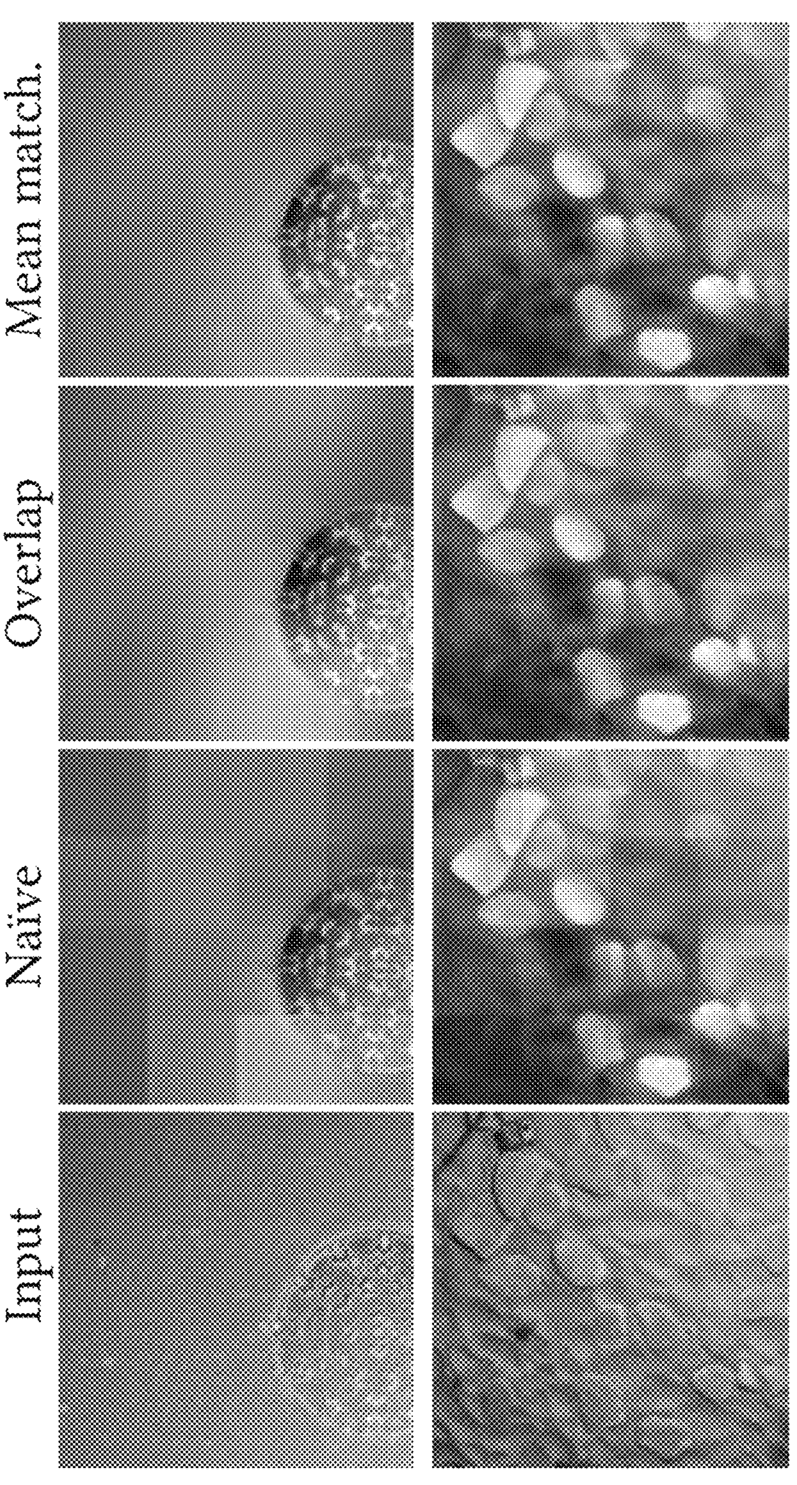
FIG. 12 illustrates graphical representations reflecting experimental results regarding the effectiveness of the digital material generation system when incorporating patched decoding in accordance with one or more embodiments.

FIG. 12 illustrates graphical representations reflecting experimental results regarding the effectiveness of the digital material generation system 106 when incorporating patched decoding in accordance with one or more embodiments. In particular, FIG. 12 shows the improvements provided when mean matching and patch overlapping is incorporated into a patched diffusion approach. The graphical representations show input digital images, results of a naïve approach to patched decoding (i.e., without additional features), results of patched decoding on overlapping patches, and results of patched decoding with mean matching. As shown, the naïve approach to patched decoding leads to a plurality of incohesive patches that fail to match in brightness and further lead to the appearance of noticeable seams. Further, while using overlapping patches does mitigate some of these effects, seams and inconsistencies are still visible among the patches. Further, the resulting digital material can suffer from blurring. By using mean matching, however, the digital material generation system 106 eliminates the appearance of seams in the output and leads to a less blurry appearance.

Figure 13:
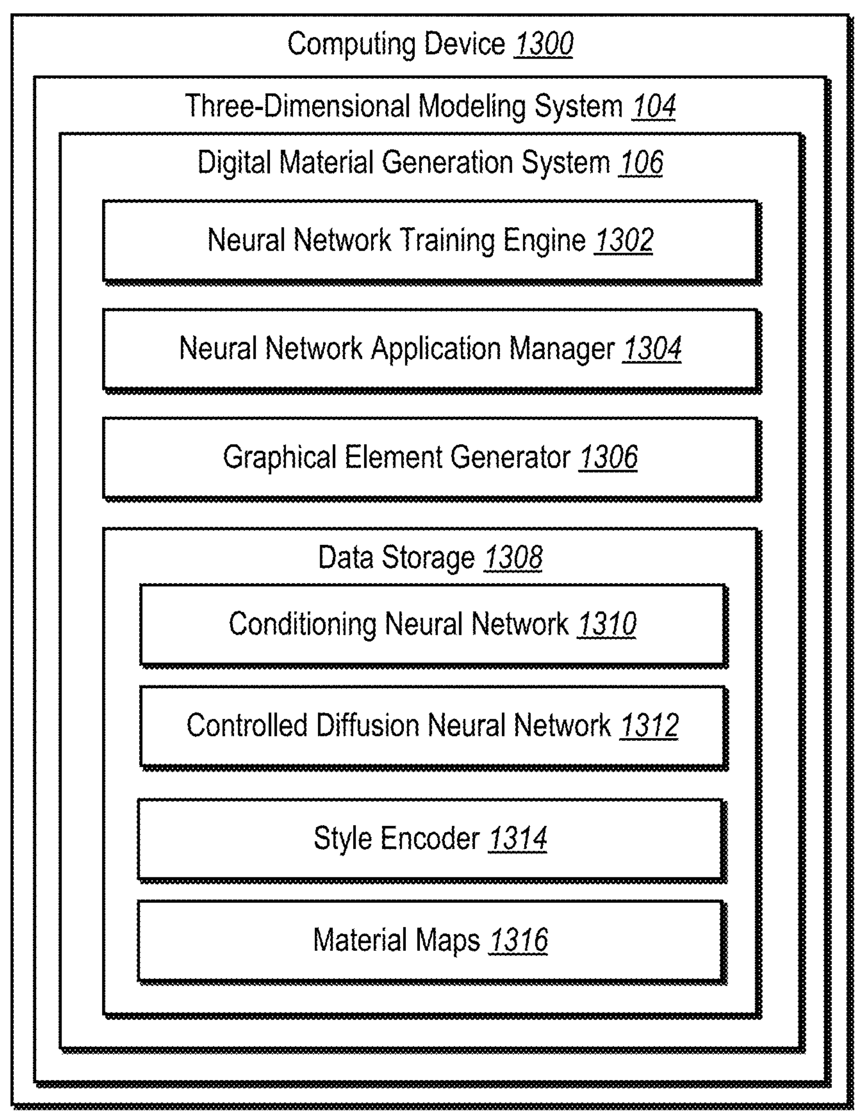
FIG. 13 illustrates an example schematic diagram of a digital material generation system in accordance with one or more embodiments.

Turning now to FIG. 13, additional detail will now be provided regarding various components and capabilities of the digital material generation system 106. In particular, FIG. 13 illustrates the digital material generation system 106 implemented by the computing device 1300 (e.g., the server(s) 102 and/or one of the client devices 110*a*-110*n* discussed above with reference to FIG. 1). Additionally, the digital material generation system 106 is also part of the three-dimensional modeling system 104. As shown, in one or more embodiments, the digital material generation system 106 includes, but is not limited to, a neural network training engine 1302, a neural network application manager 1304, a graphical element generator 1306, and data storage 1308 (which includes a conditioning neural network 1310, a controlled diffusion neural network 1312, a style encoder 1314, and material maps 1316).

As just mentioned, and as illustrated in FIG. 13, the digital material generation system 106 includes the neural network training engine 1302. In one or more embodiments, the neural network training engine 1302 trains a neural network by learning parameters for its operation. For instance, in some cases, the neural network training engine 1302 trains a conditioning neural network to generate spatial conditions from digital images and binary masks, a controlled diffusion neural network to generate denoised latent tensors based on spatial conditions and/or global conditions, or a style encoder to generate global conditions from text and/or image prompts.

Additionally, as shown in FIG. 13, the digital material generation system 106 includes the neural network application manager 1304. In one or more embodiments, the neural network application manager 1304 uses a trained neural network to perform a function. For instance, in some cases, the neural network application manager 1304 uses a conditioning neural network to generate a spatial condition and/or a style encoder to generate a global condition. In some cases, the neural network application manager 1304 further implements a controlled diffusion neural network to generate a denoised latent tensor based on the spatial condition and/or the global condition. In some cases, the neural network application manager 1304 further uses a decoder to generate material maps from denoised latent tensors.

Further, as shown in FIG. 13, the digital material generation system 106 includes the graphical element generator 1306. In one or more embodiments, the graphical element generator 1306 generates graphical elements using digital materials (e.g., using material maps). For instance, in some cases, the graphical element generator 1306 generates a digital two-dimensional or digital three-dimensional model and applies a digital material to a surface or exterior to the model. Thus, in some embodiments, the graphical element generator 1306 uses material maps generated via a controlled diffusion neural network for computer model generation.

As shown in FIG. 13, the digital material generation system 106 also includes data storage 1308. In particular, data storage 1308 includes the conditioning neural network 1310, the controlled diffusion neural network 1312, the style encoder 1314, and material maps 1316 generated using the models.

Each of the components 1302-1316 of the digital material generation system 106 optionally include software, hardware, or both. For example, the components 1302-1316 include one or more instructions stored on a computer-readable storage medium and executable by processors of one or more computing devices, such as a client device or server device. When executed by the one or more processors, the computer-executable instructions of the digital material generation system 106 cause the computing device(s) to perform the methods described herein. Alternatively, the components 1302-1316 include hardware, such as a special-purpose processing device to perform a certain function or group of functions. Alternatively, the components 1302-1316 of the digital material generation system 106 include a combination of computer-executable instructions and hardware.

Furthermore, the components 1302-1316 of the digital material generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1302-1316 of the digital material generation system 106 may be implemented as a stand-alone application, such as a desktop or mobile application. Furthermore, the components 1302-1316 of the digital material generation system 106 may be implemented as one or more web-based applications hosted on a remote server. Alternatively, or additionally, the components 1302-1316 of the digital material generation system 106 may be implemented in a suite of mobile device applications or "apps." For example, in one or more embodiments, the digital material generation system 106 comprises or operates in connection with digital software applications such as ADOBE® SUBSTANCE 3D DESIGNER or ADOBE® ILLUSTRATOR®. The foregoing are either registered trademarks or trademarks of Adobe Inc. in the United States and/or other countries.

Figure 14:
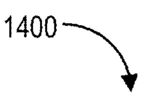
FIG. 14 illustrates a flowchart for a series of acts for generating a digital material from a digital image using a controlled diffusion neural network in accordance with one or more embodiments.
Figure 14:
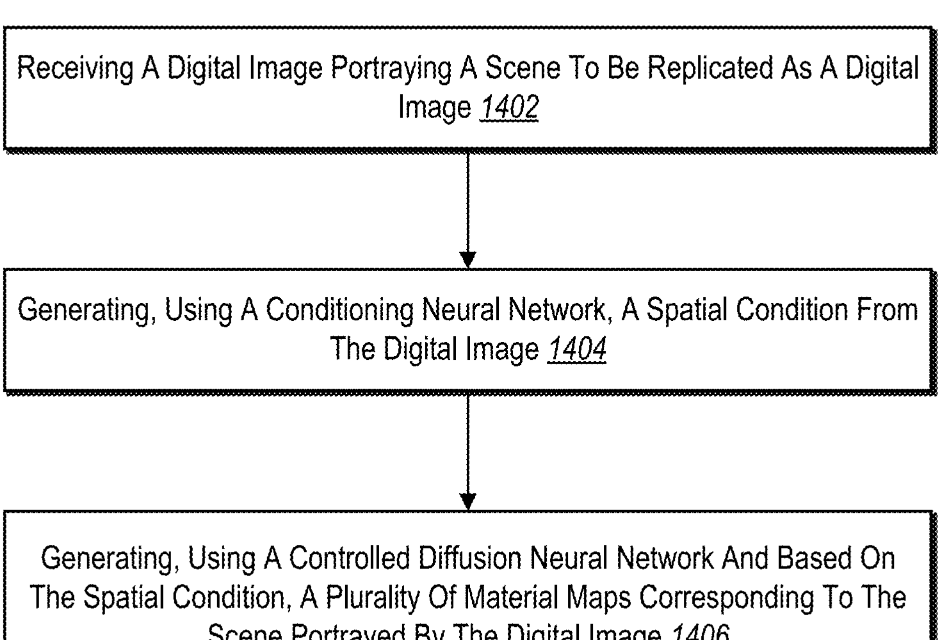

FIGS. 1-13, the corresponding text, and the examples provide a number of different methods, systems, devices, and non-transitory computer-readable media of the digital material generation system 106. In addition to the foregoing, one or more embodiments can also be described in terms of flowcharts comprising acts for accomplishing the particular result, as shown in FIG. 14. FIG. 14 may be performed with more or fewer acts. Further, the acts may be performed in different orders. Additionally, the acts described herein may be repeated or performed in parallel with one another or in parallel with different instances of the same or similar acts.

FIG. 14 illustrates a flowchart for a series of acts 1400 for generating a digital material from a digital image using a controlled diffusion neural network in accordance with one or more embodiments. FIG. 14 illustrates acts according to one embodiment, alternative embodiments may omit, add to, reorder, and/or modify any of the acts shown in FIG. 14. In some implementations, the acts of FIG. 14 are performed as part of a method. Alternatively, a non-transitory computer-readable medium can store executable instructions that, when executed by a processing device, cause the processing device to perform operations comprising the acts of FIG. 14. In some embodiments, a system performs the acts of FIG. 14. For example, in one or more embodiments, a system includes one or more memory components. The system further includes one or more processing devices coupled to the one or more memory components, the one or more processing devices to perform operations comprising the acts of FIG. 14.

The series of acts 1400 includes an act 1402 for receiving a digital image portraying a scene to be replicated as a digital material. For example, in some cases, the act 1402 involves receiving a digital image that portrays a real-world scene of one or more objects, materials, and/or textures to be replicated as a digital material.

The series of acts 1400 also includes an act 1404 for generating, using a conditioning neural network, a spatial condition from the digital image. For instance, in some embodiments, the act 1404 involves using a conditioning neural network to analyze the digital image and generate a spatial condition based on the analysis.

Further, the series of acts 1400 includes an act 1406 for generating, using a controlled diffusion neural network and based on the spatial condition, a plurality of material maps corresponding to the scene portrayed by the digital image. Indeed, in some cases, the act 1406 involves generating the digital material be generating a plurality of material maps that correspond to (e.g., collectively represent) the digital material.

In one or more embodiments, generating the plurality of material maps based on the spatial condition using the controlled diffusion neural network comprises generating the plurality of material maps based on the spatial condition using the controlled diffusion neural network over a plurality of denoising steps. Additionally, in some embodiments, generating the plurality of material maps corresponding to the scene portrayed by the digital image comprises generating a plurality of spatially varying bidirectional reflectance distribution function maps corresponding to the scene portrayed by the digital image.

In some embodiments, the digital material generation system 106 further determines a noised latent tensor from a noise distribution. Accordingly, in some instances, generating, using the controlled diffusion neural network, the plurality of material maps based on the spatial condition comprises generating, using the controlled diffusion neural network, the plurality of material maps based on the spatial condition and the noised latent tensor. In some cases, the digital material generation system 106 generates a rolled noised latent tensor by translating the noised latent tensor using a translation factor. As such, in some implementations, generating, using the controlled diffusion neural network, the plurality of material maps based on the spatial condition and the noised latent tensor comprises generating, using the controlled diffusion neural network, the plurality of material maps based on the spatial condition and the rolled noised latent tensor.

In some cases, generating, using the controlled diffusion neural network and based on the spatial condition, the plurality of material maps corresponding to the scene portrayed by the digital image comprises: generating, using the controlled diffusion neural network and based on the spatial condition, a denoised latent tensor; and generating the plurality of material maps based on the denoised latent tensor by using a decoder to decode overlapping patches of the denoised latent tensor.

In some implementations, generating, using the controlled diffusion neural network and based on the spatial condition, the plurality of material maps corresponding to the scene portrayed by the digital image comprises generating, using the controlled diffusion neural network and based on the spatial condition, the plurality of material maps from a blended noise input that comprises a mixture of noise input at a first scale and additional noise input at a second scale that is higher in scale than the first scale.

In one or more embodiments, the series of acts 1400 further includes acts for incorporating inpainting (e.g., border inpainting) when generating the digital material from the digital image. In particular, in some cases, the acts include acts for combining border inpainting with noise rolling. For instance, in some implementations, generating, using the conditioning neural network, the spatial condition from the digital image comprises generating, using the conditioning neural network, the spatial condition from the digital image and a binary mask that masks a portion (e.g., a border) of the scene portrayed by the digital image; and generating, using the controlled diffusion neural network, the plurality of material maps based on the spatial condition and the rolled noised latent tensor comprises generating the plurality of material maps based on the spatial condition and the rolled noised latent tensor by using the controlled diffusion neural network to generate content for the portion (e.g., the border) of the scene masked by the binary mask via inpainting. In some cases, the digital material generation system 106 further generates a graphical element that includes the digital material by using the plurality of material maps to create a tile of the digital material and tiling the digital material across the graphical element.

To provide an illustration, in one or more embodiments, the digital material generation system 106 receives a digital image portraying a scene to be replicated as a digital material; generates, using a conditioning neural network, a spatial condition from the digital image; and generates, using a controlled diffusion neural network and based on the spatial condition, a plurality of material maps corresponding to the scene portrayed by the digital image.

In some embodiments, the digital material generation system 106 further uses the plurality of material maps to generate a three-dimensional model by using the plurality of material maps to apply the digital material to a surface of the three-dimensional model. To illustrate, in some instances, using the plurality of material maps to apply the digital material to the surface of the three-dimensional model comprises: generating a tileable digital material from the plurality of material maps; and repeating the tileable digital material across the surface of the three-dimensional model.

In some cases, generating, using the controlled diffusion neural network and based on the spatial condition, the plurality of material maps corresponding to the scene portrayed by the digital image comprises generating the plurality of material maps using the controlled diffusion neural network and based on the spatial condition over a plurality of diffusion steps. For instance, in some implementations, generating the plurality of material maps using the controlled diffusion neural network and based on the spatial condition over the plurality of diffusion steps comprises: determining, before each diffusion step, a rolled noised latent tensor by translating a noised latent tensor using a translation factor; generating, for each diffusion step, a rolled latent tensor from the rolled noised latent tensor and based on the spatial condition using the controlled diffusion neural network; and generating, after each diffusion step, an unrolled latent tensor by unrolling the rolled latent tensor.

In some embodiments, generating, using the controlled diffusion neural network and based on the spatial condition, the plurality of material maps comprises generating the plurality of material maps via multi-scale diffusion by using the controlled diffusion neural network to: determine a low-scale noised latent tensor by processing a noised latent tensor at a first resolution via one or more low-scale diffusion steps; determine a higher-scale noised latent tensor by processing an additional noised latent tensor at a second resolution via one or more higher-scale diffusion steps, the second resolution comprising a higher resolution than the first resolution; blend the low-scale noised latent tensor with the higher-scale noised latent tensor to generate a blended noise input; and generate, using the controlled diffusion neural network, the plurality of material maps based on the spatial condition and the blended noise input.

In some cases, generating, using the controlled diffusion neural network and based on the spatial condition, the plurality of material maps comprises: generating a denoised latent tensor using the controlled diffusion neural network and based on the spatial condition; and generating the plurality of material maps from the denoised latent tensor by using a decoder to: decode overlapping patches of the denoised latent tensor; and blend the overlapping patches that have been decoded using truncated Gaussian weights.

To provide another illustration, in one or more embodiments, the digital material generation system 106 generates, using a conditioning neural network, a spatial condition from a digital image portraying a scene to be replicated as a digital material; provides the spatial condition to a controlled diffusion neural network; determines a noised latent tensor for the controlled diffusion neural network from a noise distribution; generates, using the controlled diffusion neural network over a plurality of diffusion steps, a denoised latent tensor based on the spatial condition and the noised latent tensor; and generates, using a decoder and from the denoised latent tensor, a plurality of material maps corresponding to the scene portrayed by the digital image.

In some embodiments, the digital material generation system 106 further generates, using the plurality of material maps, one or more objects within a three-dimensional design that display the scene portrayed by the digital image. In some cases, generating, using the conditioning neural network, the spatial condition from the digital image comprises generating, using the conditioning neural network, the spatial condition from the digital image and a binary mask that masks a border of the digital image; the one or more processing devices further perform operations comprising, generating, using a style encoder, a global condition from the digital image; and generating, using the controlled diffusion neural network over the plurality of diffusion steps, the denoised latent tensor based on the spatial condition and the noised latent tensor comprises generating, using the controlled diffusion neural network over the plurality of diffusion steps, the denoised latent tensor based on the spatial condition, the noised latent tensor, and the global condition. Further, in some cases, generating the plurality of material maps from the denoised latent tensor using the decoder comprises: generating, using the decoder, lower-resolution material maps from a lower-resolution version of the denoised latent tensor; generating, using the decoder, higher-resolution material maps from a higher-resolution version of the denoised latent tensor; and generating the plurality of material maps by using a mean matching operation between regions of the lower-resolution material maps and corresponding regions of the higher-resolution material maps.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
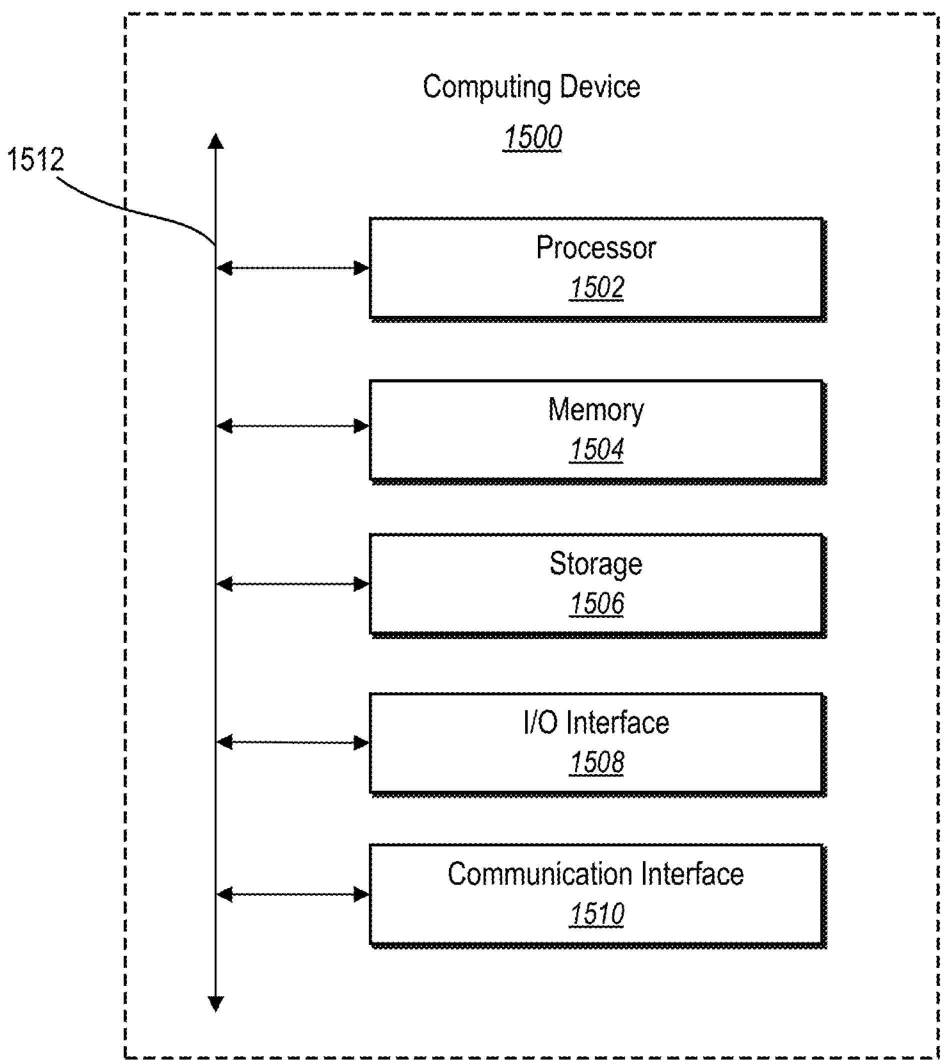
FIG. 15 illustrates a block diagram of an exemplary computing device in accordance with one or more embodiments.

FIG. 15 illustrates a block diagram of an example computing device 1500 that may be configured to perform one or more of the processes described above. One will appreciate that one or more computing devices, such as the computing device 1500 may represent the computing devices described above (e.g., the server(s) 102 and/or the client devices 110*a*-110*n*). In one or more embodiments, the computing device 1500 may be a mobile device (e.g., a mobile telephone, a smartphone, a PDA, a tablet, a laptop, a camera, a tracker, a watch, a wearable device). In some embodiments, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 including storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

receiving a digital image portraying a scene to be replicated as a digital material;

generating, using a conditioning neural network, a spatial condition from the digital image;

determining a blended noise input for generating material maps from the digital image, the blended noise input comprising a mixture of noise input at a first scale and additional noise input at a second scale that is higher in scale than the first scale; and generating a plurality of material maps corresponding to the scene portrayed by the digital image based on the spatial condition by using a controlled diffusion neural network to:

execute a diffusion step with respect to the noise input at the first scale; and execute an additional diffusion step with respect to the blended noise input at the second scale that is higher in scale than the first scale.

2. The method of claim 1, further comprising determining, from a noise distribution, a plurality of noised latent tensors corresponding to a plurality of scales, the plurality of noised latent tensors including the noise input and the additional noise input, wherein generating, using the controlled diffusion neural network, the plurality of material maps based on the spatial condition comprises generating, using the controlled diffusion neural network, the plurality of material maps based on the spatial condition and the plurality of noised latent tensors.

3. The method of claim 2, further comprising generating a rolled noised latent tensor by translating at least one noised latent tensor from the plurality of noised latent tensors using a translation factor, wherein generating, using the controlled diffusion neural network, the plurality of material maps based on the spatial condition and the plurality of noised latent tensors comprises generating, using the controlled diffusion neural network, the plurality of material maps based on the spatial condition and the plurality of noised latent tensors including the rolled noised latent tensor.

4. The method of claim 3, wherein:

generating, using the conditioning neural network, the spatial condition from the digital image comprises generating, using the conditioning neural network, the spatial condition from the digital image and a binary mask that masks a portion of the scene portrayed by the digital image; and generating, using the controlled diffusion neural network, the plurality of material maps based on the spatial condition and the plurality of noised latent tensors including the rolled noised latent tensor comprises generating the plurality of material maps based on the spatial condition and the plurality of noised latent tensors including the rolled noised latent tensor by using the controlled diffusion neural network to generate content for the portion of the scene masked by the binary mask via inpainting.

5. The method of claim 1, further comprising generating a graphical element that includes the digital material by using the plurality of material maps to create a tile of the digital material and tiling the digital material across the graphical element.

6. The method of claim 1, wherein determining the blended noise input comprises:

up-scaling the noise input from the first scale to the second scale; and blending the up-scaled noise input with the additional noise input.

7. The method of claim 1, wherein generating, using the controlled diffusion neural network and based on the spatial condition, the plurality of material maps corresponding to the scene portrayed by the digital image comprises:

generating, from the blended noise input and using the controlled diffusion neural network, a denoised latent tensor based on the spatial condition; and generating the plurality of material maps based on the denoised latent tensor by using a decoder to decode overlapping patches of the denoised latent tensor.

8. The method of claim 1, wherein generating the plurality of material maps based on the spatial condition using the controlled diffusion neural network comprises generating the plurality of material maps based on the spatial condition using the controlled diffusion neural network over a plurality of diffusion steps that include the diffusion step, the additional diffusion step, and one or more further diffusion steps.

9. The method of claim 1, wherein generating the plurality of material maps corresponding to the scene portrayed by the digital image comprises generating a plurality of spatially varying bidirectional reflectance distribution function maps corresponding to the scene portrayed by the digital image.

10. A non-transitory computer-readable medium storing executable instructions, which when executed by a processing device, cause the processing device to perform operations comprising:

receiving a digital image portraying a scene to be replicated as a digital material;

generating, using a conditioning neural network, a spatial condition from the digital image;

determining a blended noise input for generating material maps from the digital image, the blended noise input comprising a mixture of noise input at a first scale and additional noise input at a second scale that is higher in scale than the first scale; and generating a plurality of material maps corresponding to the scene portrayed by the digital image based on the spatial condition by using a controlled diffusion neural network to:

execute a diffusion step with respect to the noise input at the first scale; and execute an additional diffusion step with respect to the blended noise input at the second scale that is higher in scale than the first scale.

11. The non-transitory computer-readable medium of claim 10, wherein the operations further comprise using the plurality of material maps to generate a three-dimensional model by using the plurality of material maps to apply the digital material to a surface of the three-dimensional model.

12. The non-transitory computer-readable medium of claim 11, wherein using the plurality of material maps to apply the digital material to the surface of the three-dimensional model comprises:

generating a tileable digital material from the plurality of material maps; and repeating the tileable digital material across the surface of the three-dimensional model.

13. The non-transitory computer-readable medium of claim 10, wherein generating, from the blended noise input and using the controlled diffusion neural network, the plurality of material maps corresponding to the scene portrayed by the digital image based on the spatial condition comprises generating the plurality of material maps from the blended noise input and using the controlled diffusion neural network over a plurality of diffusion steps based on the spatial condition, the plurality of diffusion steps including the diffusion step, the additional diffusion step, and one or more further diffusion steps.

14. The non-transitory computer-readable medium of claim 13, wherein generating the plurality of material maps from the blended noise input using the controlled diffusion neural network and based on the spatial condition over the plurality of diffusion steps comprises:

determining, before each diffusion step, a rolled noised latent tensor by translating the blended noise input using a translation factor;

generating, for each diffusion step, a rolled latent tensor from the rolled noised latent tensor and based on the spatial condition using the controlled diffusion neural network; and generating, after each diffusion step, an unrolled latent tensor by unrolling the rolled latent tensor.

15. The non-transitory computer-readable medium of claim 10, wherein determining the blended noise input comprising the mixture of the noise input at the first scale and the additional noise input at the second scale comprises:

determining a lower-scale noised latent tensor by processing a noised latent tensor at the first scale via the diffusion step at the first scale and at least one additional diffusion step at the first scale;

determining a higher-scale noised latent tensor by processing an additional noised latent tensor at the second scale via the additional diffusion step at the second scale and at least one further diffusion step at the second scale; and blending the lower-scale noised latent tensor with the higher-scale noised latent tensor to generate the blended noise input.

16. The non-transitory computer-readable medium of claim 10, wherein generating, from the blended noise input and using the controlled diffusion neural network, the plurality of material maps based on the spatial condition comprises:

generating a denoised latent tensor from the blended noise input using the controlled diffusion neural network and based on the spatial condition; and generating the plurality of material maps from the denoised latent tensor by using a decoder to:

decode overlapping patches of the denoised latent tensor; and blend the overlapping patches that have been decoded using truncated Gaussian weights.

17. A system comprising:

one or more memory components; and one or more processing devices coupled to the one or more memory components, the one or more processing devices to perform operations comprising:

generating, using a conditioning neural network, a spatial condition from a digital image portraying a scene to be replicated as a digital material;

providing the spatial condition to a controlled diffusion neural network;

determining a noised latent tensor at a first scale for the controlled diffusion neural network from a noise distribution;

determining a blended noise input from the noised latent tensor at the first scale and an additional noised latent tensor at a second scale that is higher than the first scale;

generating, using the controlled diffusion neural network over a plurality of diffusion steps, a denoised latent tensor based on the spatial condition by:

executing a diffusion step with respect to the noised latent tensor at the first scale; and executing an additional diffusion step with respect to the blended noise input at the second scale that is higher in scale than the first scale; and generating, using a decoder and from the denoised latent tensor, a plurality of material maps corresponding to the scene portrayed by the digital image.

18. The system of claim 17, wherein the one or more processing devices further perform operations comprising generating, using the plurality of material maps, one or more objects within a three-dimensional design that display the scene portrayed by the digital image.

19. The system of claim 17, wherein:

generating, using the conditioning neural network, the spatial condition from the digital image comprises generating, using the conditioning neural network, the spatial condition from the digital image and a binary mask that masks a border of the digital image;

the one or more processing devices further perform operations comprising, generating, using a style encoder, a global condition from the digital image; and generating, using the controlled diffusion neural network over the plurality of diffusion steps, the denoised latent tensor based on the spatial condition and the blended noise input comprises generating, using the controlled diffusion neural network over the plurality of diffusion steps, the denoised latent tensor based on the spatial condition, the blended noise input, and the global condition.

20. The system of claim 17, wherein generating the plurality of material maps from the denoised latent tensor using the decoder comprises:

generating, using the decoder, lower-resolution material maps from a lower-resolution version of the denoised latent tensor;

generating, using the decoder, higher-resolution material maps from a higher-resolution version of the denoised latent tensor; and generating the plurality of material maps by using a mean matching operation between regions of the lower-resolution material maps and corresponding regions of the higher-resolution material maps.

* * * * *